(12) United States Patent
Li et al.

(10) Patent No.: US 9,608,690 B2
(45) Date of Patent: Mar. 28, 2017

(54) TYPE 1 AND TYPE 2 HOPPING FOR DEVICE-TO-DEVICE COMMUNICATIONS

(71) Applicant: QUALCOMM Incorporated, San Diego, CA (US)

(72) Inventors: Qiao Li, Princeton, NJ (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/729,753

(22) Filed: Jun. 3, 2015

(65) Prior Publication Data

US 2016/0020822 A1 Jan. 21, 2016

Related U.S. Application Data

(60) Provisional application No. 62/025,927, filed on Jul. 17, 2014.

(51) Int. Cl.
*H04B 1/715* (2011.01)
*H04W 72/04* (2009.01)
(Continued)

(52) U.S. Cl.
CPC ............ *H04B 1/715* (2013.01); *H04W 4/005* (2013.01); *H04W 72/042* (2013.01);
(Continued)

(58) Field of Classification Search
CPC   H04B 1/713; H04B 1/715; H04B 2001/7152; H04B 2001/7154; H04W 4/005;
(Continued)

(56) References Cited

U.S. PATENT DOCUMENTS

| 2005/0176371 | A1  | 8/2005 | Palin et al. |
| 2012/0002616 | A1* | 1/2012 | Ishii ...................... H04B 1/713 370/329 |

(Continued)

OTHER PUBLICATIONS

Ericsson, "Frequency Hopping for E-UTRA Uplink," TSG-RAN WG1 #46bis, R1-062851, Seoul, Korea, Oct. 9-13, 2006, 2 pgs., 3rd Generation Partnership Project.

(Continued)

*Primary Examiner* — David B. Lugo
(74) *Attorney, Agent, or Firm* — Holland & Hart LLP

(57) ABSTRACT

Methods, systems, and devices are described for coordinating a device to device (D2D) hopping scheme with a wide area network (WAN) hopping scheme. In one aspect, a method may include identifying, by a base station, a WAN frequency hopping scheme. The base station may coordinate a D2D frequency hopping scheme a D2D enabled user equipment (UE) with the identified WAN frequency hopping scheme, and communicate the D2D frequency hopping scheme to the D2D enabled UE. In one aspect, the D2D frequency hopping pattern may apply to retransmissions between two D2D enabled UEs. Another method may include receiving, by a D2D enabled UE, a D2D frequency hopping scheme from a base station, where the D2D frequency hopping scheme is coordinated with a WAN frequency hopping scheme. The D2D enabled UE may transmit at least one message to a second D2D enabled UE according to the D2D frequency hopping scheme.

22 Claims, 12 Drawing Sheets

(51) Int. Cl.
    *H04W 4/00*     (2009.01)
    *H04W 72/14*     (2009.01)

(52) U.S. Cl.
    CPC . *H04W 72/0493* (2013.01); *H04B 2001/7152* (2013.01); *H04W 72/0453* (2013.01); *H04W 72/14* (2013.01)

(58) Field of Classification Search
    CPC ......... H04W 72/0406; H04W 72/0413; H04W 72/0493; H04W 72/14; H04W 72/042
    See application file for complete search history.

(56) References Cited

U.S. PATENT DOCUMENTS

| 2015/0078279 | A1* | 3/2015 | Ko | H04L 1/1861 |
| | | | | 370/329 |
| 2016/0150504 | A1* | 5/2016 | Chae | H04L 5/0044 |
| | | | | 375/133 |

OTHER PUBLICATIONS

ISA/EPO, International Search Report and Written Opinion of the International Searching Authority, Int'l Appl. No. PCT/US2015/034121, Sep. 18, 2015, European Patent Office, Rijswijk, NL, 10 pgs.

Qualcomm Incorporated, "eNB Resource Allocation for D2D Broadcast Communication," 3GPP TSG-RAN WG2 #85bis, R2-141685, Valencia, Spain, Mar. 31-Apr. 4, 2014, 6 pgs., 3rd Generation Partnership Project.

\* cited by examiner

TYPE 1 AND TYPE 2 HOPPING FOR DEVICE-TO-DEVICE COMMUNICATIONS

CROSS REFERENCES

The present application for patent claims priority to U.S. Provisional Patent Application No. 62/025,927 by Li et al., entitled "Type 1 and Type 2 Hopping for Device-to-Device Communications," filed Jul. 17, 2014, assigned to the assignee hereof, and expressly incorporated by reference herein.

FIELD OF THE DISCLOSURE

The following relates generally to wireless communication, and more specifically to coordinating re-transmission schemes for device to device (D2D) communications in a wide area network (WAN).

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices or user equipments (UEs). Base stations may communicate with UEs on downstream or forward links and on upstream or uplinks. Each base station has a coverage range, which may be referred to as the coverage area of the cell.

Multiple UEs connected to a WAN or other networks may transmit data or control information on the uplink to a serving base station at the same time, which may cause inter-cell or intra-cell interference. WANs may utilize different types of frequency hopping techniques or schemes to reduce the inter-cell and intra-cell interference for data transmission or retransmission.

Some UEs may also be configured to communicate with other UEs via D2D communication protocols. The transmission or retransmission techniques utilized for D2D communications may conflict, and thus cause interference with the inter-cell or intra-cell frequency hopping implemented in the WAN.

SUMMARY

The described features generally relate to one or more improved systems, methods, or apparatuses for coordinating D2D frequency hopping schemes with WAN frequency hopping schemes. More particularly, some examples are directed to coordinating D2D retransmissions with WAN HARQ transmissions.

In one aspect, a method of wireless communication may include identifying, by a base station, a wide area network (WAN) frequency hopping scheme. The method may further include coordinating a device to device (D2D) frequency hopping scheme for at least one D2D enabled user equipment (UE) with the identified WAN frequency hopping scheme, and communicating the D2D frequency hopping scheme to the at least one D2D enabled UE. In some cases, coordinating the D2D frequency hopping scheme with the WAN frequency hopping scheme may include configuring the D2D frequency hopping scheme to reduce interference with the WAN frequency hopping scheme. In some aspects, the WAN frequency hopping scheme may include a fixed offset signaled via a Physical Downlink Control Channel (PDCCH) for every other transmission of a Hybrid Automatic Repeat Request (HARQ) process.

In some examples, coordinating the D2D frequency hopping scheme with the WAN frequency hopping scheme may include utilizing a first offset for even transmissions, wherein each even transmission is transmitted an even number of subframes after a first transmission, and utilizing a second offset for odd transmissions. In some implementations, the second offset may be set to zero. Communicating the D2D frequency hopping scheme to the at least one D2D enabled UE may include transmitting at least one of the first offset, or the second offset, or both, via the PDCCH. At least one of the fixed offset, or the first offset, or the second offset, or a combination thereof may include a number of resource blocks. In certain aspects, the method may include identifying a set of resources specific to D2D communications, wherein the D2D frequency hopping scheme is based at least in part on the identified set of resources.

In some cases, the WAN frequency hopping scheme may include a cell specific hopping and mirroring scheme. In this scenario, coordinating the D2D frequency scheme with the WAN frequency hopping scheme may include associating a cell identification (ID) of the base station with the D2D frequency hopping scheme. Communicating the D2D frequency hopping scheme to the at least one D2D enabled UE may include transmitting a D2D scheduling grant via the PDCCH to the at least one D2D enabled UE. In some cases, the D2D scheduling grant may include instructions instructing the D2D enabled UE to transmit the cell ID to a second D2D enabled UE not associated with the cell ID.

In some aspects, communicating the D2D frequency hopping scheme to the at least one D2D enabled UE may include transmitting a D2D scheduling grant to the at least one D2D enabled UE specifying a first resource to transmit the scheduling assignment. The D2D scheduling grant may include instructions instructing the D2D enabled UE to transmit the cell ID to a second D2D enabled UE not associated with the cell ID. In this scenario, the first resource may implicitly indicate the cell ID.

In some examples, the WAN frequency hopping scheme may include a cell specific hopping and mirroring scheme, such that coordinating the D2D frequency hopping scheme with the WAN frequency hopping scheme includes determining a subset of resources for the D2D frequency hopping scheme based on resources for the WAN frequency hopping scheme. In some cases, communicating the D2D frequency hopping scheme to the at least one D2D enabled UE may include transmitting an indication of the subset of resources for the D2D frequency hopping scheme to the at least one D2D enabled UE. The indication of the subset of resources may include a low resource block threshold or a high resource block threshold, or both. In some cases, the WAN frequency hopping scheme may apply to uplink transmissions. Additionally or alternatively, the WAN frequency hopping scheme may utilize HARQ.

In another aspect, a method of wireless communication may include receiving, by a D2D enabled UE, a D2D frequency hopping scheme from a base station associated with a WAN. The D2D frequency hopping scheme may be coordinated with a WAN frequency hopping scheme. The method may further include transmitting at least one message to a second D2D enabled UE according to the D2D frequency hopping scheme. In some cases, the at least one message may include a scheduling assignment.

In some examples, the D2D frequency hopping scheme may include a first offset to be applied for even transmissions, wherein each even transmission is transmitted an even number of subframes after a first transmission. In some cases, the D2D frequency hopping scheme may additional include a second offset to be applied for odd transmissions.

In some cases, the WAN frequency hopping scheme may include a cell specific hopping and mirroring scheme. In this scenario, the D2D frequency hopping scheme may be associated with a cell ID, which is further associated with the WAN frequency hopping scheme. The method may further include determining resources for transmitting the at least one D2D message based on the WAN frequency hopping scheme. Additionally, the at least one D2D message may be transmitted on a first resource, with the first resource implicitly indicating the cell ID.

In other cases, where WAN frequency hopping scheme may include a cell specific hopping and mirroring scheme and the D2D frequency hopping scheme may include a low resource block threshold or a high resource block threshold. In this scenario, the method may additionally include determining resources for transmitting the at least one D2D message based on the low resource block threshold or the high resource block threshold.

In another aspect, a base station may include means for identifying a WAN frequency hopping scheme, and means for coordinating a D2D frequency hopping scheme for at least one D2D enabled UE with the identified WAN frequency hopping scheme. The base station may additionally include means for communicating the D2D frequency hopping scheme to the at least one D2D enabled UE.

In another aspect, a UE may include means for receiving a D2D frequency hopping scheme from a base station associated with a WAN. The D2D frequency hopping scheme may be coordinated with a WAN frequency hopping scheme. The UE may further include means for transmitting at least one message to a second D2D enabled UE according to the D2D frequency hopping scheme.

In yet another aspect, a base station may include a WAN frequency hopping module to identify a WAN frequency hopping scheme. The base station may additionally include a D2D frequency hopping module to coordinate a D2D frequency hopping scheme for at least one D2D enabled UE with the identified WAN frequency hopping scheme. The base station may further include a transmitter to communicate the D2D frequency hopping scheme to the at least one D2D enabled UE.

In one aspect, a UE may include a D2D frequency hopping determination module to receive a D2D frequency hopping scheme from a base station associated with a WAN, where the D2D frequency hopping scheme is coordinated with a WAN frequency hopping scheme. The UE may additionally include a transmitter to transmit at least one message to a second D2D enabled UE according to the D2D frequency hopping scheme.

In some examples, a non-transitory computer-readable medium may store computer-executable code for wireless communication. The code may be executable by a processor of a base station to identify a WAN frequency hopping scheme and to coordinate a D2D frequency hopping scheme for at least one D2D enabled UE with the identified WAN frequency hopping scheme. The code may further be executable by the processor to communicate the D2D frequency hopping scheme to the at least one D2D enabled UE.

In some examples, a non-transitory computer-readable medium may store computer-executable code for wireless communication. The code may be executable by a processor of a D2D enabled UE to receive a D2D frequency hopping scheme from a base station associated with a WAN, where the D2D frequency hopping scheme is coordinated with a WAN frequency hopping scheme. The code may further be executable by the processor to transmit at least one message to a second D2D enabled UE according to the D2D frequency hopping scheme.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
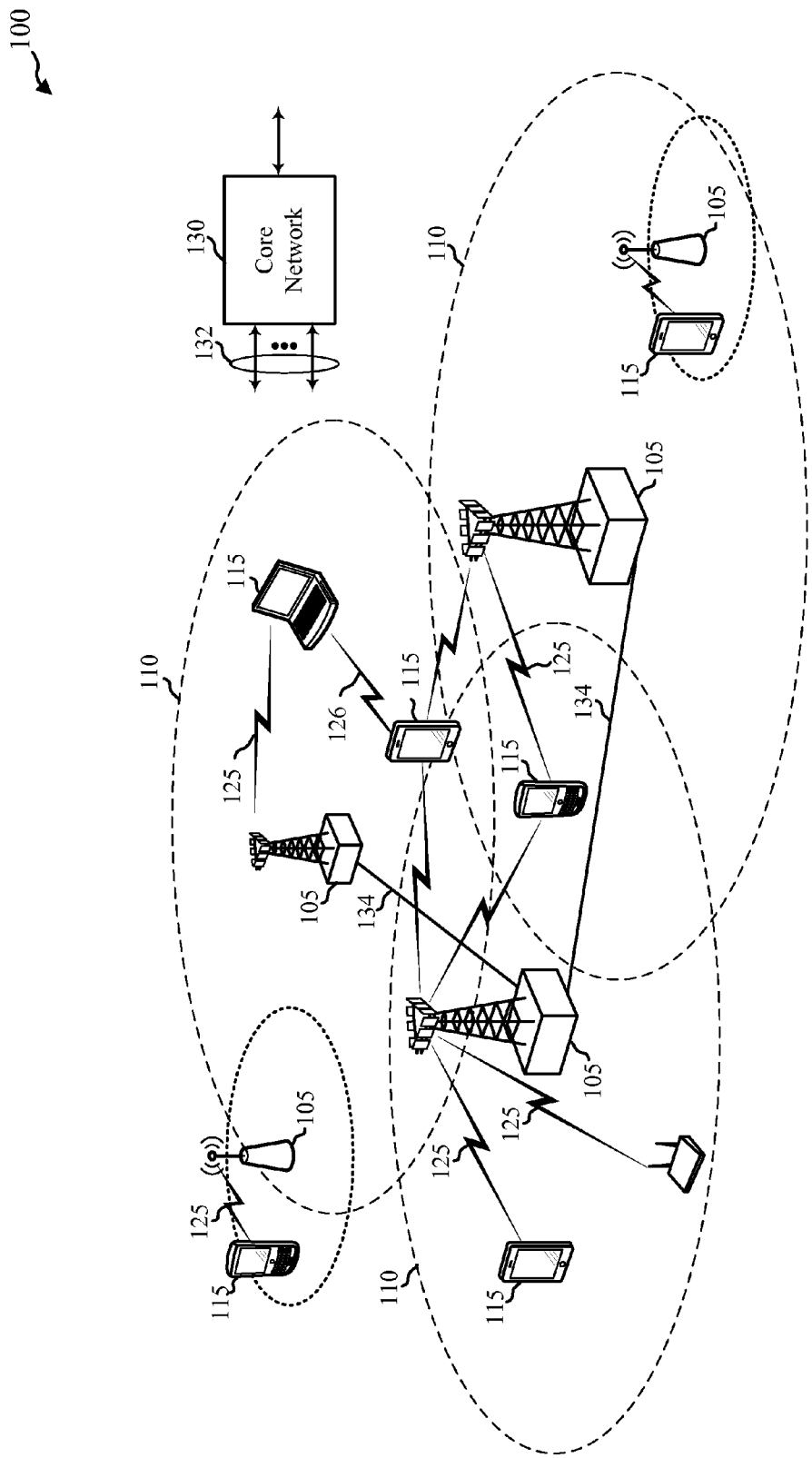
FIG. 1 shows a block diagram of a wireless communications system.

The described features generally relate to one or more improved systems, methods, or apparatuses for coordinating device to device (D2D) frequency hopping schemes with wide area network (WAN) frequency hopping schemes. In one aspect, a base station, which may be associated with a WAN, may identify a WAN frequency hopping scheme. The base station may coordinate a D2D frequency hopping scheme for at least one D2D enabled user equipment (UE) with the identified WAN frequency hopping scheme. The base station may then communicate the D2D frequency hopping scheme to the D2D enabled UE. The WAN may coordinate or configure the D2D frequency hopping scheme to reduce interference with the WAN frequency hopping scheme. In some examples, the described techniques may be applied to coordinating uplink D2D retransmissions with uplink WAN Hybrid Automatic Repeat Request (HARQ) transmissions/retransmissions.

In one aspect, the WAN frequency hopping scheme may include using a fixed frequency offset for every other retransmission in a HARQ process (type 1 frequency hopping). In FDD systems, HARQ transmissions/retransmissions may occur every 8th subframe. The D2D UE, on the other hand, may use a randomized transmission/retransmission scheme that may potentially interfere or conflict (overlap) with the resources used by the WAN frequency hopping scheme. In this scenario, coordinating the D2D frequency hopping scheme may include setting a first frequency offset for retransmissions of a control block over even numbered subframes after the first transmission of the same control block. Similarly, a second frequency offset may be set for odd numbered retransmissions. In some cases, the second offset may be set to zero. In this way, interference due to overlapping resources used for WAN HARQ transmissions and D2D transmissions may be reduced.

In one aspect, the WAN frequency hopping scheme may include using cell-specific frequency hopping and mirroring (type 2 frequency hopping). As in the type 1 case, D2D transmissions/retransmissions may interfere with type 2 WAN frequency hopping schemes. To avoid/reduce this interference, the WAN base station may associate a cell identification (ID) with a D2D frequency hopping scheme. The D2D frequency hopping scheme may be generated by the same random or pseudo random number generator seed as the WAN frequency hopping scheme. The base station may communicate the cell ID/D2D frequency hopping scheme to the D2D UE, for example in a scheduling grant over the Physical Downlink Control Channel (PDCCH). The D2D UE may then communicate the cell ID (which is associated with the D2D frequency hopping scheme) to another D2D UE, for instance, that is not associated with the same cell, in a scheduling assignment (either explicitly or implicitly). In this way, communications of the D2D UE with an inter-cell D2D UE may be coordinated with the WAN frequency hopping scheme to reduce interference.

In yet one aspect, coordinating a D2D frequency hopping scheme with a type 2 WAN frequency hopping scheme may include determining a subset of available resources and reserving those resources for D2D transmissions/retransmissions. That is, resources (e.g., time and frequency) may be specifically allocated for, or assigned to, D2D communications (i.e., some resources may be D2D-specific resources). The subset of resources may be defined by a low resource block threshold, a high resource block threshold, or both. The subset of resources may be communicated to the D2D UE(s) and other devices associated with the WAN to enable coordination and thus reduce interference between D2D and WAN communications. In some examples, a base station may associate a D2D frequency hopping scheme with D2D-specific resources. That is, the D2D frequency hopping scheme may be specific to the resources allocated or reserved for D2D use.

The WAN base station may communicate a D2D frequency hopping scheme to a D2D UE in the form of one or more instructions. The D2D UE may then transmit one or more messages (e.g., a scheduling assignment) to another D2D UE according to the D2D frequency hopping scheme. In some examples, the base station may communicate the resources that are specifically allocated for D2D communications to the D2D UE. In certain aspects, the base station may communicate the D2D-specific resources and the associated D2D frequency hopping scheme to the D2D UE.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a block diagram illustrates an example of a wireless communications system 100. The wireless communications system 100 includes base stations (or cells) 105, user equipments (UEs) 115, and a core network 130. The base stations 105 may communicate with the UEs 115 under the control of a base station controller, which may be part of the core network 130 or the base stations 105 in various examples. Base stations 105 may communicate control information or user data with the core network 130 through backhaul 132. In some examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters may transmit modulated signals simultaneously on the multiple carriers. For example, each communication link 125, between a base station 105 and UE 115, or communication link 126, between two UEs 115, may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some examples, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The coverage area 110 for a base station may be divided into sectors making up only a portion of the coverage area. The wireless communications system 100 may include base stations 105 of different types (e.g., macro, micro, or pico base stations). There may be overlapping coverage areas for different technologies.

In some examples, the wireless communications system 100 may be an LTE/LTE-A network, wide area network (WAN), etc. In LTE/LTE-A networks, the terms evolved Node B (eNB) may be generally used to describe the base stations 105. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another (e.g., directly or indirectly) via backhaul links 134 (e.g., X2, etc.) or via backhaul 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

In some cases, a UE 115 may operate within the coverage areas 110 of more than one base station 105. A UE 115 may also operate within the coverage area 110 of a single base station 105. In either case, various UEs 115 may be within close enough proximity to communicate directly via D2D communications.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. In some cases, communication links 126 may support device to device (D2D) communications between UEs 115.

In some instances, interference may occur between D2D communications over link(s) 126 and uplink communications over link(s) 125. For example, wireless communications system 100, which may also be called a WAN, or base station 105 of WAN 100 may implement a WAN frequency hopping scheme for communications over links 125, particularly for retransmissions according to a HARQ process. The WAN frequency hopping scheme may conflict with D2D communications between two UEs 115 over links 126, thus causing interference and degrading communication performance (e.g., throughput, error correction, etc.).

Figure 2:
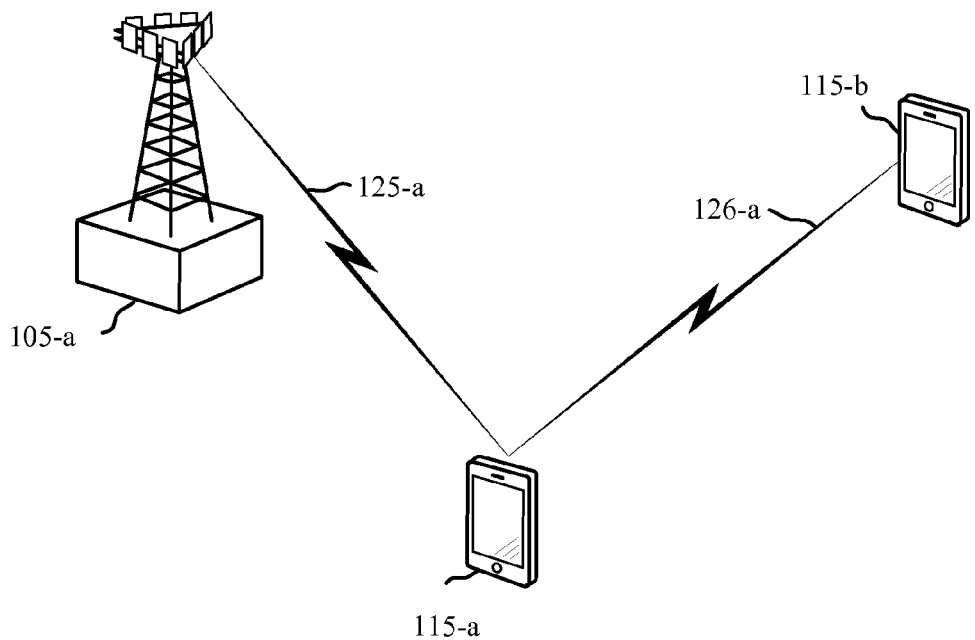
FIG. 2 shows a block diagram of an exemplary wireless communications system including a first UE in communication with a base station and a second UE.

Referring to FIG. 2, a block diagram illustrates an example of a wireless communications system 200. The wireless communications system 200, which may be an example of wireless communications system 100 described in reference to FIG. 1, includes two D2D enabled UEs 115-*a* and 115-*b* and a base station 105-*a*. D2D UE 105-*a* may communicate with base station 105-*a* over link 125-*a* and with UE 115-*b* over link 126-*a*. UEs 115-*a* and 115-*b* or base station 105-*a* may be examples of UEs 115 or base stations 105 described in reference to FIG. 1.

In some examples, base station 105-*a* may implement a frequency hopping scheme or sequence for communications across link 125-*a* with UE 115-*a*. The frequency hopping scheme may be a type 1 hopping scheme (fixed frequency offset for transmissions) or a type 2 hopping scheme (cell specific hopping and mirroring), or other types of hopping schemes. In some cases, type 1 WAN frequency hopping may provide for hopping with limited resource options, whereas type 2 WAN frequency hopping may provide for better diversity due to sub-band hopping and mirroring operations. Type 2 hopping may provide for better inter-cell interference management. In yet some cases, both type 1 and type 2 are limited by resource allocation constraints, as both are limited by the size of resource allocation field in DCI format 0. Additionally, the maximum number of RBs for a single user for type 2 hopping is further limited by the size of a sub-band.

In order to reduce signaling overhead for the retransmissions of UE 115-*a*, the retransmissions of UE 115-*a* may assume synchronous operation (e.g., fixed timing across a cell served by base station 105) with automatic scheduling of retransmissions every fixed number of subframes (e.g., 8 subframes).

In some examples, the frequency hopping scheme may be applied to uplink communications from the UE 115-*a* over links 125-*a*, such as for HARQ retransmissions when a first transmission over link 125-*a* fails (e.g., when an acknowledgment (ACK) message is not received by the UE 115-*a*). HARQ retransmissions by the UE 115-*a* may occur at set intervals after the first (original) transmission is sent. For example, in FDD systems, the interval may be every 8th subframe.

In some cases, the UE 115-*a* may concurrently communicate with base station 105-*a* over link 125-*a* and UE 115-*b* over link 126-*a*. The UE 115-*a* may communicate with UE 115-*b* over link 126-*a* via D2D communication protocols, which may be different than WAN communication protocols used by the UE 115-*a* to communicate with base station 105-*a* over link 125-*a*. In particular, D2D frequency hopping schemes for retransmissions may be random or pseudo random. This may result in interference between WAN HARQ retransmissions over link 125-a and D2D retransmissions over link 126-a.

In order to mitigate this interference, the base station 105-a may coordinate a D2D frequency hopping scheme with a WAN frequency hopping scheme. The base station 105-a may communicate the D2D frequency hopping scheme to the UE 115-a via control signaling over link 125-a (e.g., using the PDCCH). In this way, the UE 115-a may communicate with UE 115-b over link 126-a without causing unavoidable interference with WAN communications, and particularly uplink HARQ transmissions from UE 115-a and other UEs 115 (not shown) communicating with base station 105-a.

Figure 3A:
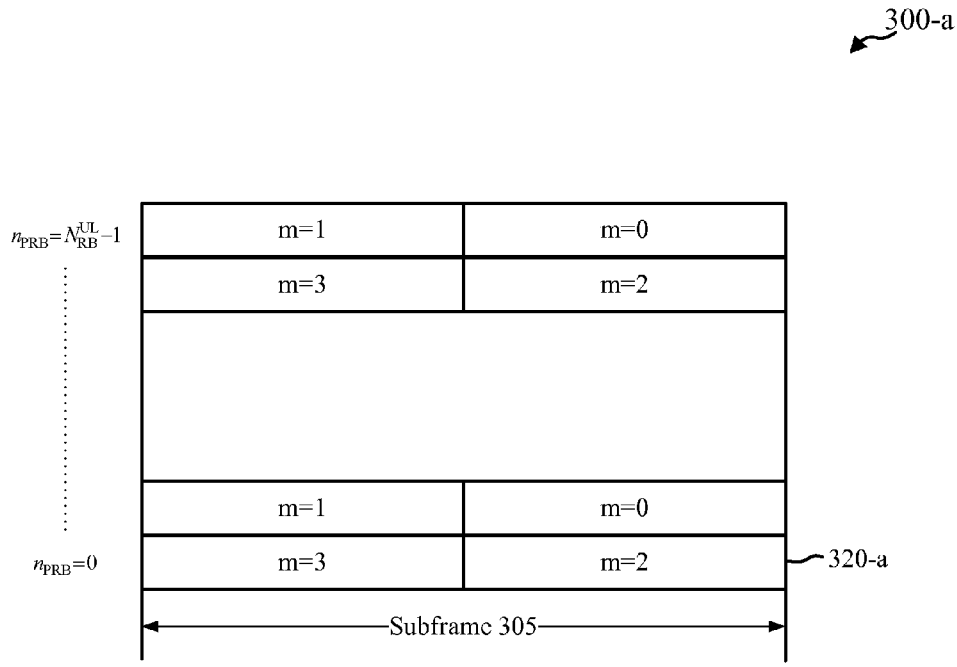
FIG. 3A shows a block diagram of communication resources including one subframe divided into multiple resource blocks.
Figure 3B:
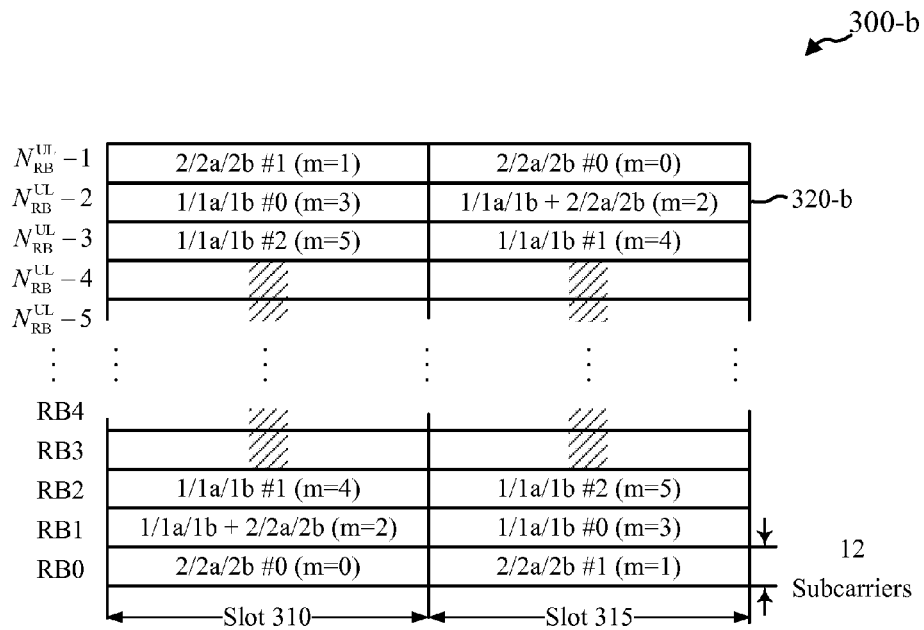
FIG. 3B shows another block diagram of communication resources including two slots of one subframe divided into multiple resource blocks.

Referring to FIGS. 3A and 3B, block diagrams illustrates communication resources 300-a and 300-b including one subframe 305 divided into resource blocks that may be used by a UE 115 for communicating with one or more UEs 115 or base stations 105 on the uplink, as described in reference to FIG. 1 or 2. Each subframe 305 may be approximately 1 millisecond (ms) in duration, and 10 subframes may make up a radio frame. Each subframe 305 may include two slots, 310, 315. Each radio frame may thus include 20 slots.

LIE utilizes orthogonal frequency division multiplexing (OFDM) on the downlink and single-carrier frequency division multiplexing (SC-FDM) on the uplink. OFDM and SC-FDM partition the system bandwidth into multiple orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers may be dependent on the system bandwidth. For example, the number of subcarriers may be equal to 128, 256, 512, 1024 or 2048 for system bandwidth of 1.25, 2.5, 5, 10 or 20 MHz, respectively.

Resource blocks 320-a, 320-b may be defined in each slot 310, 315. Each resource block may cover multiple subcarriers (e.g., 12 subcarriers) in one slot 310, 315. The number of resource blocks in each slot may be dependent on the system bandwidth and may range from 6 to 110. The resource blocks may also be referred to as physical resource blocks (PRBs). Multiple subbands (not shown) including one or more PRBs may also be defined, where the number of subbands may be dependent on the system bandwidth.

Referring in particular to resources 300-a of FIG. 3A, multiple resource blocks 320 numbered $n_{PRB}=0$ to $n_{PRB}=n_{RB}^{UL}-1$ of subframe 305 are shown. Each resource block 320 may be partitioned by slot, such as m=0 through m=3. The physical resource mapping for each slot 310, 315 of resource block 300-a may be represented by:

$$n_{PRB} = \begin{cases} \lfloor \frac{m}{2} \rfloor & \text{if } (m+n_s\bmod2)\bmod2 = 0 \\ N_{RB}^{UL} - 1 - \lfloor \frac{m}{2} \rfloor & \text{if } (m+n_s\bmod2)\bmod2 = 1 \end{cases}$$

where
$n_{PRB}$ Physical resource block number
$n_s$ Slot number within a radio frame Referring now to resources 300-b of FIG. 3B, a frequency hopping pattern may be repeated across subframes in a radio frame for the same resource index. The hopping pattern may be carried out over the Physical Uplink Control Channel (PUCCH), and may include multiple PUCCH formats, such as 1/1a/1b, 2/2a/2b, 3, etc. For example, generally each resource block per slot may be represented by:

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \frac{N_{cs}^{(1)}}{8} \right\rceil & \text{otherwise} \end{cases}$$

where size $$N_{RB}^{(2)}$$

(in resource blocks (RBs)) is specified by higher layers, and the PUCCH resource index $$n_{PUCCH}^{(2,\tilde{p})}$$

is given by higher layers for periodic CSI reporting.

For PUCCH formats 2/2a/2b, each resource block may be mapped on band-edge RBs (m=0,1), where m may be represented by:

$$m = \lfloor n_{PUCCH}^{(2,\tilde{p})} / N_{sc}^{RB} \rfloor$$

For PUCCH formats 1/1a/1b mixed with formats 2/2a/2b (m=2), m may be represented by:

$$m = \{N_{RB}^{(2)} \text{ if } n_{PUCCH}^{(1,\tilde{p})} < c \cdot N_{cs}^{(1)}/\Delta_{shift}^{PUCCH}$$

In some cases, multiplexing may be performed by applying different cyclic time shifts to formats 1/1a/1b and 2/2a/2b. For example, with 12 shifts, $$N_{cs}^{(1)} \in \{0, 1, \ldots, 7\}$$

are assigned to format 1/1a/1b, resulting in $$N_{cs}^{(1)}/\Delta_{shift}^{PUCCH}$$

possible shifts, where $$\Delta_{shift}^{PUCCH} \in \{1, 2, 3\}.$$

In some cases, both parameters may be provided by higher layers. A non-mixed region may be allocated if $$N_{cs}^{(1)} = 0.$$

In addition, for each time shift, a parameter c representing a number of time domain orthogonal spreading codes for multiplexing (also corresponding to the number of reference symbols per slot) may be chosen resulting in a total of $$cN_{cs}^{(1)}/\Delta_{shift}^{PUCCH}$$

possible resource indices for format 1/1a/1b.

For PUCCH formats 1/1a/1b (e.g., not mixed with formats 2/2a/2b) (m=3, 4, or 5), m may be represented by:

$$m = \left\{ \left[ \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right] + N_{RB}^{(2)} + \left\lceil \frac{N_{cs}^{(1)}}{8} \right\rceil \right\}$$

In some cases, the calculation of the number of indices may be the same as the mixed case described above, with all 12 shifts applied.

$$n_{PUCCH}^{(1,\tilde{p})}$$

may be determined for semi-persistent scheduled downlink data transmissions over the Physical Downlink Shared Channel (PDSCH) by a higher layer. For dynamic downlink data transmissions (including HARQ retransmissions for semi-persistent data), $$n_{PUCCH}^{(1,\tilde{p})}$$

may be determined implicitly based on the index of the first CCE of the PDCCH message.

For PUCCH format 3, such as for multiple acknowledgement/negative acknowledgements (ACK/NACKs) for carrier aggregation, m may be represented by:

$$m = \lfloor n_{PUCCH}^{(3,\tilde{p})}/N_{SF,0}^{PUCCH} \rfloor$$

where $$N_{SF,0}^{PUCCH}$$

represents a number of non-reference symbols in the first slot of a subframe (which may also correspond to the number of orthogonal spreading codes).

Figure 4:
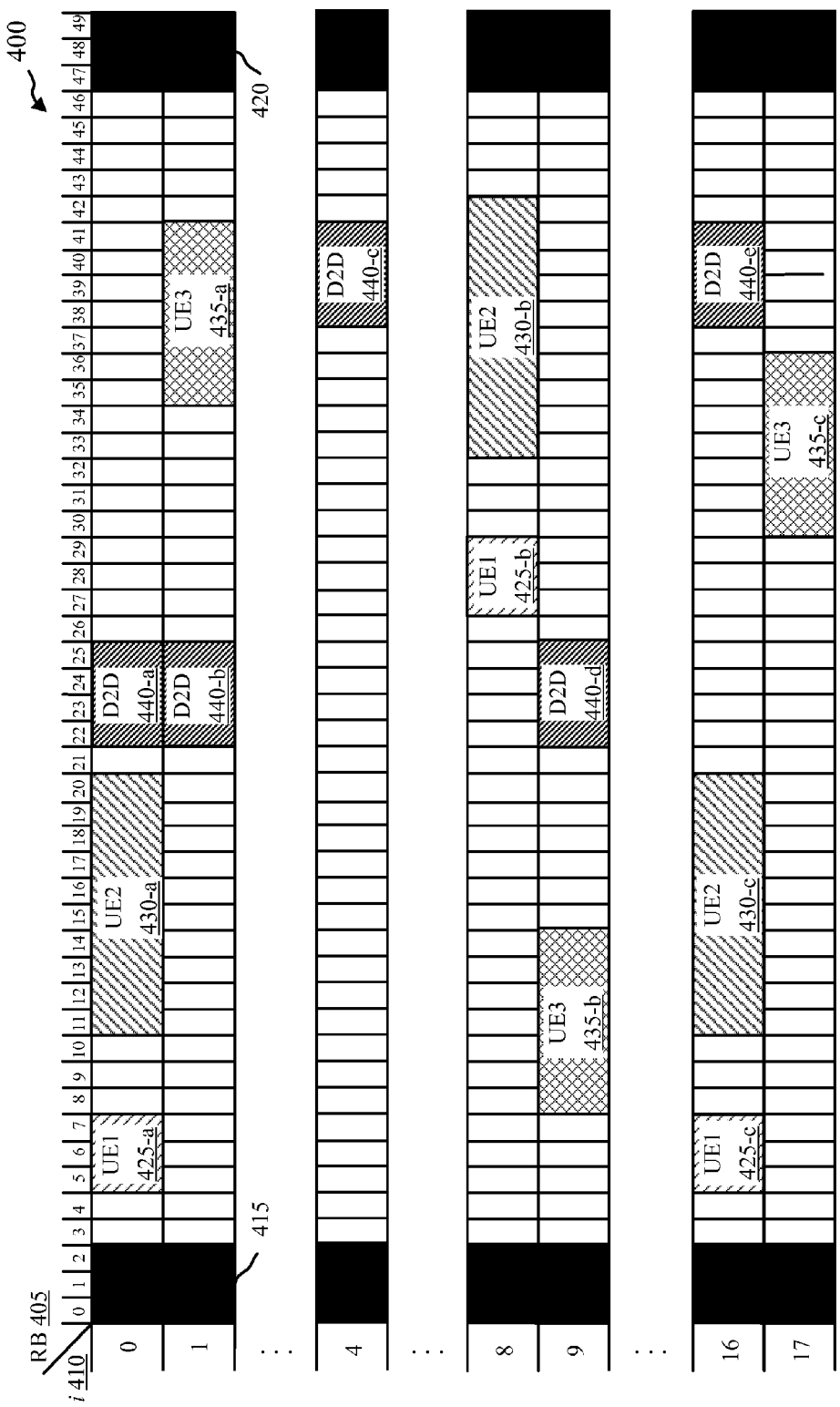
FIG. 4 shows a block diagram of an example coordination of communications resources utilized by three WAN UEs and a D2D enabled UE.

Referring to FIG. 4, a block diagram illustrates uplink communication resources 400 divided into 0 through 49 resource blocks (RBs) 405 and multiple subframes represented by index i 410. Resources 400 may be examples of one or more aspects of resources 300-a or 300-b described in reference to FIG. 3A or 3B. Resources 400 may be used for uplink communications, such as over links 125, 126 by a UE 115 (e.g., UE 115-a of FIG. 2), with base station(s) 105 (e.g., base station 105-a of FIG. 2), or communications with UE(s) 115 (e.g., UE 115-b of FIG. 2), as described above in reference to FIG. 1 or 2.

As illustrated, resources 415 and 420 (corresponding to RBs 0-2 and 47-49) may be reserved for communication over the PUCCH, such as for control information, etc.; however, it should appreciated that other RBs 405 may be reserved or utilized for the PUCCH. Additionally, RBs 0-49 may represent one subband, with RBs 3-46 representing PUSCH resources. However, it should be appreciated that any other number of RBs 405 are contemplated herein, and the RBs 405 may be divided into any number of subbands. In the example illustrated, resources 400 are utilized by three UEs 115 and a D2D UE. For example, UE1 may assigned to transmit on the uplink at resources 425, UE2 at 430, and UE3 at 435. D2D UE transmissions may be scheduled on resources 440.

A serving base station 105 may assign particular resources to each of UE1 through UE3 and may define a WAN frequency hopping pattern for such transmissions (e.g. for uplink transmissions to the base station 105). In some cases, a transmission from any of UEs 1-3 may fail such that the same information (e.g., packet, code block, etc.) may need to be retransmitted. In some cases, retransmission may be scheduled according to a HARQ process, such that retransmissions occur at a given interval of subframes after the first failed transmission (e.g., when no ACK is received). For example, in FDD systems, the interval may be set at 8 subframes.

Base station 105 may instruct UEs 1-3 to utilize a fixed frequency offset for every other retransmission for HARQ, to improve transmission diversity and reduce interference. This may correspond to type 1 hopping. The first time slot (which may represent a subframe 410 as shown in FIG. 4 or a slot, such as 310, 315 of FIGS. 3A and 3B) may be represented by:

$$N_{PRB}^{S1}(i) = \tilde{n}_{PRB}^{S1}(i) + \tilde{N}_{RB}^{HO}/2 \text{ where } \tilde{N}_{RB}^{HO} = N_{RB}^{HO} + (N_{RB}^{HO} \mod 2)$$

and $$\tilde{n}_{PRB}^{S1}(i) = RB_{START} \text{ (obtained from uplink scheduling grant)}$$

where $N_{RB}^{HO}$ is equal to the PUSCH hopping offset determined by the higher layers.

The second time slot may be determined by applying the fixed offset:

$$n_{PRB}(i) = \tilde{n}_{PRB}(i) + \tilde{N}_{RB}^{HO}/2$$

and may be according to the following relationship:

| System BW $N_{RB}^{UL}$ | Number of Hopping bits | Information in hopping bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \mod N_{RB}^{PUSCH}$ |
| | | 1 | Type 2 PUSCH Hopping |
| 50-110 | 2 | 00 | $(\lfloor N_{RB}^{PUSCH}/4 \rfloor + \tilde{n}_{PRB}^{S1}(i)) \mod N_{RB}^{PUSCH}$ |
| | | 01 | $(-\lfloor N_{RB}^{PUSCH}/4 \rfloor + \tilde{n}_{PRB}^{S1}(i)) \mod N_{RB}^{PUSCH}$ |
| | | 10 | $(\lfloor N_{RB}^{PUSCH}/2 \rfloor + \tilde{n}_{PRB}^{S1}(i)) \mod N_{RB}^{PUSCH}$ |
| | | 11 | Type 2 PUSCH Hopping |

For inter-subframe hopping, the above may be applied the to even and odd transmissions.

For example, UE1 may transmit on RBs 5-7 in subframe 0 at 425-a. After determining that transmission 425-a was not properly received, UE1 may then be instructed to retransmit at RBs 26-29 in subframe 8 at 425-b. This retransmission may be according to a fixed offset of 22 RBs; however, it should be appreciated that other frequency offsets may be utilized. If the retransmission fails again, UE1 may be instructed to retransmit over RBs 4-7 in subframe 16 at 425-c, and so forth. UEs 2 and 3 may be instructed to follow the same retransmission hopping pattern (e.g., 22 RB offset for every other transmission), but starting at different RBs (e.g., UE2 at RBs 11-20 in subframe 0 at 430-*a* and UE3 at RBs 35-41 in subframe 1 at 435-*a*).

To coordinate a D2D frequency hopping pattern for retransmissions with the type 1 WAN frequency hopping described above, the base station 105 may instruct the D2D UE to apply a first offset on even numbered subframes after the first transmission 440-*a* and apply a second offset on odd numbered subframes after the first transmissions 440-*a*. In some cases, the second offset may be set to zero RBs. Because D2D retransmission schemes are generally not synchronized as HARQ retransmission schemes, D2D retransmissions may occur on a more random basis such that retransmissions may occur at any number of subframes after a first transmission 440-*a*. A base station 105 may determine the D2D frequency hopping scheme and communicate the scheme to the D2D UE. In this way, interference/conflicts on RBs may be reduced between WAN HARQ retransmissions 425, 430, or 435, and D2D retransmissions 440.

As illustrated, the D2D UE may first transmit to another D2D UE at 440-*a* including RBs 22-25 at subframe 0. The D2D UE may be instructed to retransmit 440-*b* in subframe 1 at the zero offset (e.g., at RBs 22-25). The D2D UE may then be instructed, according to the D2D frequency hopping pattern, to retransmit at 440-*c* in subframe 4 (even subframe) at RBs 38-41 (e.g., a 16 RB offset), at 440-*d* at RBs 22-25 in subframe 9 (e.g., a 0 RB offset), and at 440-*e* at RBs 38-41 in subframe 16 (e.g., a 16 RB offset). In this way, a D2D retransmission frequency hopping scheme may be coordinated by the base station 105 to avoid or minimize collisions with other uplink transmissions of UEs 115 communicating via the WAN.

It should be appreciated that other offsets are contemplated for D2D retransmissions, and may vary for each retransmission. Furthermore, other numbers of subframe intervals may be implemented between D2D retransmissions, according to different schemes, patterns, etc. The D2D frequency hopping scheme may be determined based on congestion in the served network, number of UEs 115 communicating on the uplink, previously collected or determined interference metrics, etc.

Inter-subframe hopping is shown in FIG. 4. However, it should be appreciated that intra-subframe hopping may be implemented in a similar manner, with every subframe split into two slots 310, 315.

Figure 5:
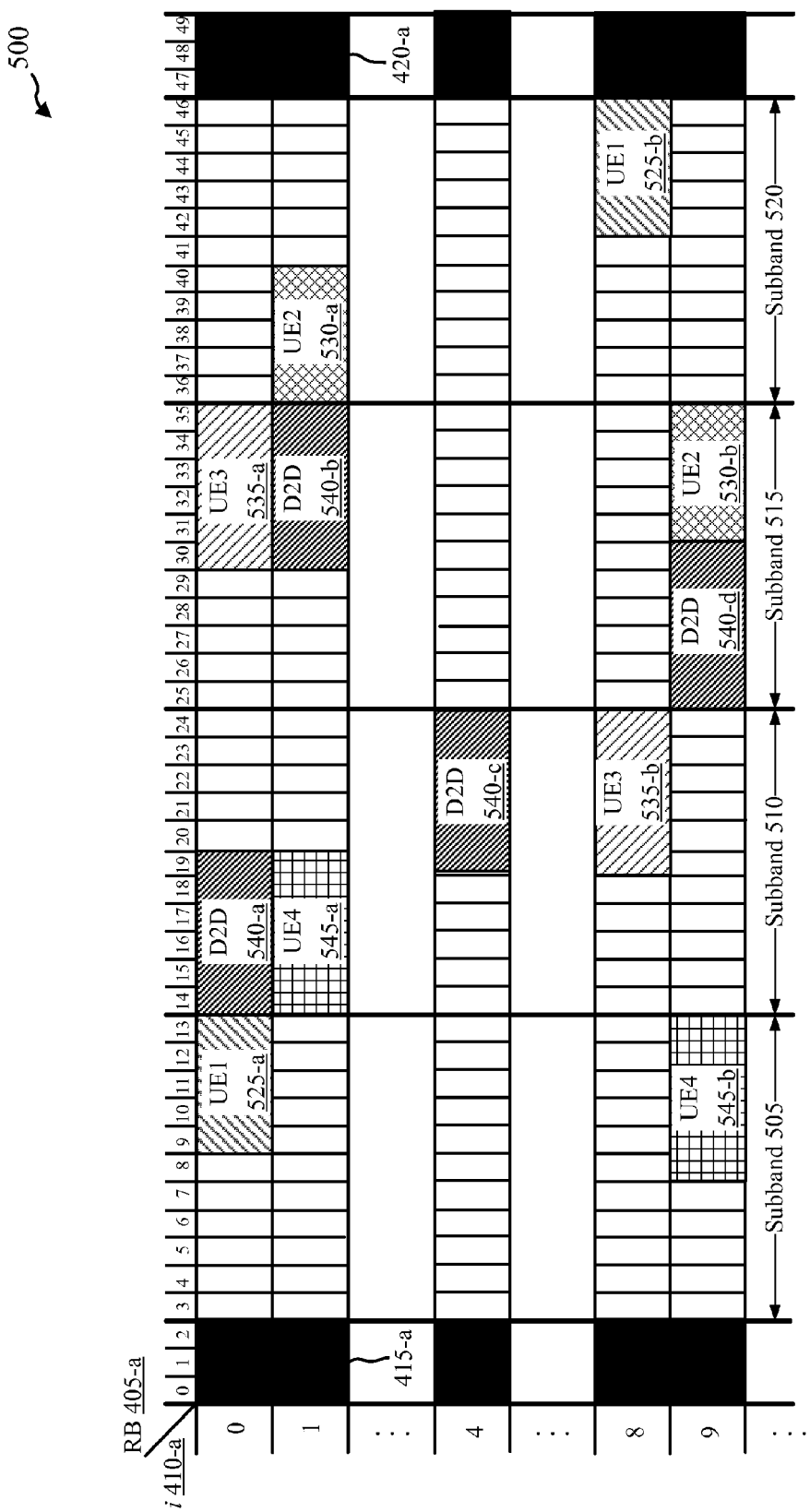
FIG. 5 shows a block diagram of another example coordination of communications resources utilized by four WAN UEs and a D2D enabled UE.

Referring to FIG. 5, a block diagram illustrates uplink communication resources 500 divided into 0 through 49 resource blocks (RBs) 405-*a* and multiple subframes represented by index i 410-*a*. Resources 500 may be examples of one or more aspects of resources 300-*a*, 300-*b*, or 400 described in reference to FIG. 3A, 3B, or 4. Resources 500 may be used by a UE 115 (e.g., UE 115-*a* of FIG. 2) for uplink communications over links 125 with base station(s) 105, and D2D communications over link 126 with other D2D UE(s) 115, as described above in reference to FIG. 1 or 2.

As illustrated, resources 415-*a* and 420-*a* (corresponding to RBs 0-2 and 47-49) may be reserved for communication over the PUCCH, such as for control information, etc. RBs 3-46 (e.g., PUSCH resources) may be partitioned into 4 subbands 505, 510, 515, and 520, with each subband including 11 RBs. In the example illustrated, resources 500 are utilized by four UEs 115 and a D2D UE. For example, UE1 may assigned to transmit on the uplink at resources 525, UE2 at 530, UE3 at 535, and UE4 at 545. D2D UE transmissions may be scheduled on resources 540.

A serving base station 105 may assign particular resources to each of UE1 through UE4 and may define a WAN frequency hopping pattern for such transmissions (e.g., for uplink transmissions to the base station 105). In some cases, a transmission from any of UEs 1-4 may fail, such that the same information (e.g., packet, code block, etc.) may need to be retransmitted. In some cases, retransmission may be scheduled according to a HARQ process, such that retransmissions occur at a given interval of subframes after the first failed transmission (e.g., 8 subframes).

Base station 105 may instruct UEs 1-4 to utilize a type 2 frequency hopping scheme for HARQ retransmissions, for example to improve transmission diversity and reduce interference. Type 2 hopping may include cell-specific hopping and mirroring. Type 2 hopping may be represented by:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

where $N_{sb}$: number of sub-bands given by higher layers $N_{RB}^{HO}$: pusch-HoppingOffset, given by higher layers Type 2 hopping may also be represented by:

$$\tilde{n}_{PRB}(n_s) = (\tilde{n}_{VRB} + \underbrace{f_{hop}(i) \cdot N_{RB}^{sb}}_{\substack{Hopping \\ across\ subbands}} + \underbrace{((N_{RB}^{sb} - 1) - 2(\tilde{n}_{VRB} \bmod N_{RB}^{sb})) \cdot f_m(i))}_{Mirroring\ within\ a\ subband} \bmod (N_{RB}^{sb} \cdot N_{sb})$$

where: $i =$ $$\begin{cases} \lfloor n_s/2 \rfloor & \text{inter-subframe hopping} \\ n_s & \text{intra and inter-subframe hopping} \end{cases} \quad \begin{array}{l} \text{Specifies intra or inter} \\ \text{subframe hopping} \end{array}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

$n_{VRB}$: set of virtual RBs from scheduling grant

Calculation of subband size may be given by:

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}$$

The subband hopping function may be represented by:

$$f_{hop}(i) = \begin{cases} 0 & N_{sb} = 1 \\ \left( f_{hop}(i-1) + \sum_{k=i \cdot 10+1}^{i \cdot 10+9} c(k) \times 2^{k-(i \cdot 10+1)} \right) \bmod N_{sb} & N_{sb} = 2 \\ \left( f_{hop}(i-1) + \left( \sum_{k=i \cdot 10+1}^{i \cdot 10+9} c(k) \times 2^{k-(i \cdot 10+1)} \right) \bmod (N_{sb} - 1) + 1 \right) \bmod N_{sb} & N_{sb} > 2 \end{cases}$$

where $c(k)$: pseudo-random sequence initialized with cell ID.

The mirroring function may be represented by:

$$f_m(i) = \begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

In one example, UE1 may transmit on resources 525-*a* (RBs 9-13) in subframe 0 in subband 505. After determining that transmission 525-*a* was not properly received, UE1 may then retransmit, according to a WAN frequency hopping scheme, at 525-*b* (RBs 42-46) in subframe 8 in subband 520. This retransmission may represent a subband hop of 3 subbands and no mirroring (transmissions 525-*b* is at the end of subband 520 as transmission 525-*a* was also at the end of subband 505). Similarly, UE3 may be instructed to transmit on resources 535-*a* (RBs 30-35) in subframe 0 in subband 515. After a failed transmission, UE3 may, according to a WAN frequency hopping pattern, retransmit at resources 535-*b* (RBs 20-24) in subframe 8 in subband 510. This retransmission may represent a subband hop of 1 subband and no mirroring. UE2 may first transmit at 530-*a* (RBs 36-40) in subframe 1 in subband 520. After a failed transmission, UE2 may retransmit at 530-*b* (RBs 30-35) in subframe 9 in subband 515. UE4 may first transmit at 545-*a* (RBs 14-19) in subframe 1 in subband 510, and after a failed transmission, may retransmit at 545-*b* (RBs 8-13) in subframe 9 in subband 505. The retransmissions of one or more of UEs 1-4 may continue according to any of a variety of hopping schemes. Thus, because the resources utilized according to type 2 hopping are less consistent than type 1 hopping, a simple offset based on the number of subframes may be less effective (e.g., the example described in reference to FIG. 4).

To coordinate a D2D frequency hopping pattern for retransmissions with the type 2 WAN frequency hopping described above, the base station 105 may associate a cell identification (ID) of the base station 105 with a D2D frequency hopping scheme. The D2D frequency hopping scheme may be coordinated with the type 2 WAN frequency hopping scheme. In some cases, coordinating may include seeding the D2D frequency hopping pattern with the same seed used for the type 2 WAN frequency hopping scheme (e.g., based on the equations as described above, with the same seed in a random number generator, etc.). In other cases, coordinating may include predictively avoiding resources utilized by the WAN frequency hopping scheme. In some aspects, the base station 105 may associate D2D-specific resources with a D2D frequency hopping scheme. For instance, the D2D frequency hopping scheme may be specific to the resources reserved for D2D communications.

In some cases, the WAN frequency hopping scheme and the D2D frequency hopping scheme may have the same logical RB to physical RB mapping sequence. In this scenario, the base station 105 may know which logical RBs are occupied by the WAN UEs 1-4 due to the nature of synchronous HARQ implemented on the uplink. In this case, the base station 105 may easily allocate D2D resources to avoid collisions.

In some examples, the base station 105 may determine the D2D frequency hopping scheme. In other examples, the D2D UE 115 may receive information of the WAN frequency hopping scheme, and determine at least part of the D2D frequency hopping scheme/determine when to transmit one or more messages to another D2D UE 115 based on the WAN frequency hopping information.

As illustrated, the D2D UE may first transmit to another D2D UE at 540-*a* (RBs 14-19) in subframe 0 in subband 510. The D2D UE may be instructed to retransmit at 540-*b* (RBs 30-35) in subframe 1 in subband 515. The D2D UE may then be instructed, according to the D2D frequency hopping pattern, to retransmit at 540-*c* (RBs 20-24 in subframe 4 in subband 510), and at 540-*d* (RBs 25-30 in subframe 9 in subband 515), and so on. In this way, a D2D retransmission frequency hopping scheme may be coordinated by the base station 105 to avoid or minimize collisions with other uplink transmissions of UEs 115 communicating via the WAN.

In some examples, the base station 105 may transmit a D2D scheduling grant according to the D2D frequency hopping scheme via the PDCCH to the D2D enabled UE 115. The scheduling grant may include instructions instructing the D2D enabled UE to transmit the cell ID to a second D2D enabled UE, wherein the second D2D enabled UE is not associated with the cell ID (i.e., is associated with another cell). In this way, inter-cell interference may be mitigated by coordinating inter-cell D2D retransmissions.

In other examples, the scheduling grant may specify a first resource for the D2D UE 115 to transmit a scheduling assignment to an inter-cell D2D UE 115. In this scenario, the first resource used to transmit the scheduling assignment may implicitly indicate the cell ID. In this instance, the base station 105 may establish rules for determining/indicating which resources are associated with different neighboring cell IDs, and thus what D2D frequency hopping scheme is applicable. When the D2D UE 115 transmits a scheduling assignment to an inter-cell D2D UE 115, the inter-cell D2D UE 115 may determine which cell ID (and hence what D2D frequency scheme) is to be utilized for communications with the sending D2D UE 115. In some examples, the base station 105 may determine a D2D frequency scheme based on the resources specifically reserved for D2D communications. In such an instance, the base station 105 may send an indication of the D2D-specific resources and the associated frequency hopping scheme to the D2D UE 115.

Inter-subframe hopping is shown in FIG. 5. However, it should be appreciated that intra-subframe hopping may be implemented in a similar manner, with every subframe split into two slots 310, 315.

Figure 6:
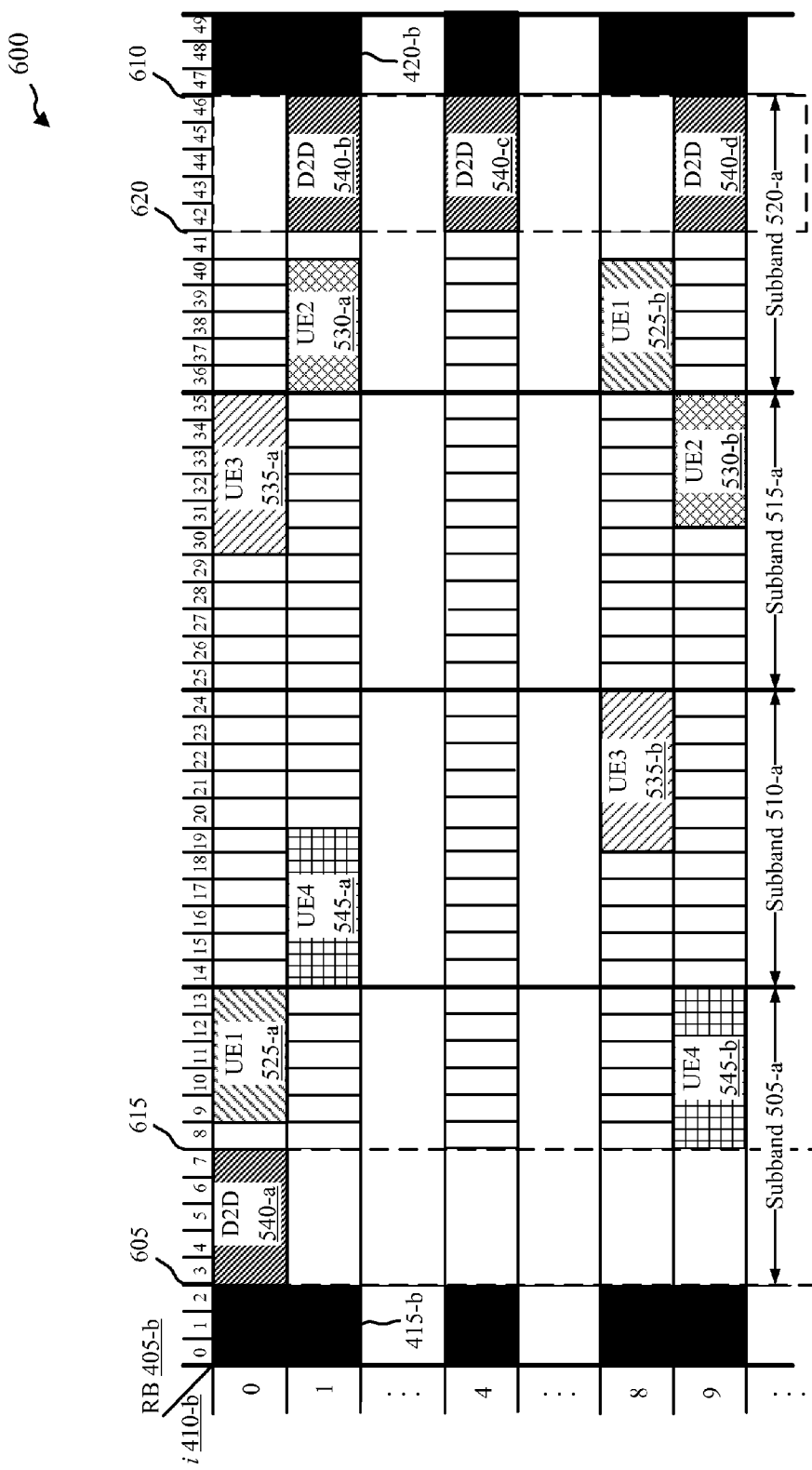
FIG. 6 shows a block diagram of another example coordination of communications resources utilized by four WAN UEs and a D2D enabled UE.

Referring to FIG. 6, a block diagram illustrates uplink communication resources 600 divided into 0 through 49 resource blocks (RBs) 405-*b* and multiple subframes represented by index i 410-*b*. Resources 600 may be examples of one or more aspects of resources 300-*a*, 300-*b*, 400, or 500 described in reference to FIG. 3A, 3B, 4, or 5. Resources 600 may be used by a UE 115 (e.g., UE 115-*a* of FIG. 2) for uplink communications over links 125 with base station(s) 105, and D2D communications over link 126 with other D2D UE(s) 115, as described above in reference to FIG. 1 or 2.

As illustrated, resources 415-*b* and 420-*b* (corresponding to RBs 0-2 and 47-49) may be reserved for communication over the PUCCH, such as for control information, etc. RBs 3-46 (e.g., PUSCH resources) are partitioned into 4 subbands 505-*a*, 510-*a*, 515-*a*, and 520-*a*, with each subband including 11 RBs. In the example illustrated, resources 600 are utilized by four UEs 115 and a D2D UE. For example, UE1 may assigned to transmit on the uplink at resources 525, UE2 at 530, UE3 at 535, and UE4 at 545. D2D UE transmissions may be scheduled on resources 540. The frequency hopping for uplink transmissions for UEs 1-4 may follow a type 2 hopping pattern as described above in reference to FIG. 5. Accordingly, the frequency hopping of UEs 1-4 will not be repeated here for the sake of brevity.

As illustrated in FIG. 6, coordination of a D2D frequency hopping scheme with a type 2 WAN frequency hopping scheme may include partitioning off a portion or subset of PUSCH resources (e.g., RBs 3-7 and 42-46 as illustrated) for D2D communications only. The base station 105 may set one or more thresholds to indicate to the D2D UE 115 and UEs 1-4 which resources are to be utilized by the D2D UE 115. In some cases the threshold may include one or more high resource block thresholds, such as 605, 610, or one or more low resource block thresholds 615, 620. In this example, the D2D UE may transmit/retransmit between thresholds 605 and 610 in subframe 0, and between thresholds 610 and 620 in subframes 1, 4, and 9. In this implementation, intra-cell and inter-cell interference may be reduced or eliminated with minimum overhead (e.g., only the four thresholds may be needed to implement this D2D frequency hopping scheme). It should be appreciated that other hops of varying subframes, RBs, etc., may be utilized with similar effect. In this scenario, a default cell ID may be used at least in part to indicate the D2D frequency hopping scheme (e.g., a value of 510).

In any of the examples described above in reference to FIG. 4, 5, or 6, the D2D frequency hopping scheme may be communicated by the base station 105 to the D2D UE 115 via a scheduling grant. The scheduling grant may be in the form of a system information block (SIB) and may include one or more of the following parameters:

1. A PUSCH upper hopping offset (N_HO_RB), which may indicate how many RBS are utilized on each edge of the available resources for the PUCCH;
2. A number of subbands (N_sb), which may indicate the number of sub-bands for Type 2 hopping;
3. A PUSCH lower hopping offset (N_LO_RB), which may be used to avoid conflict with PUSCH for D2D only communications; or
4. A D2D cell ID, which may be used for D2D hopping pattern determination.

Figure 7:
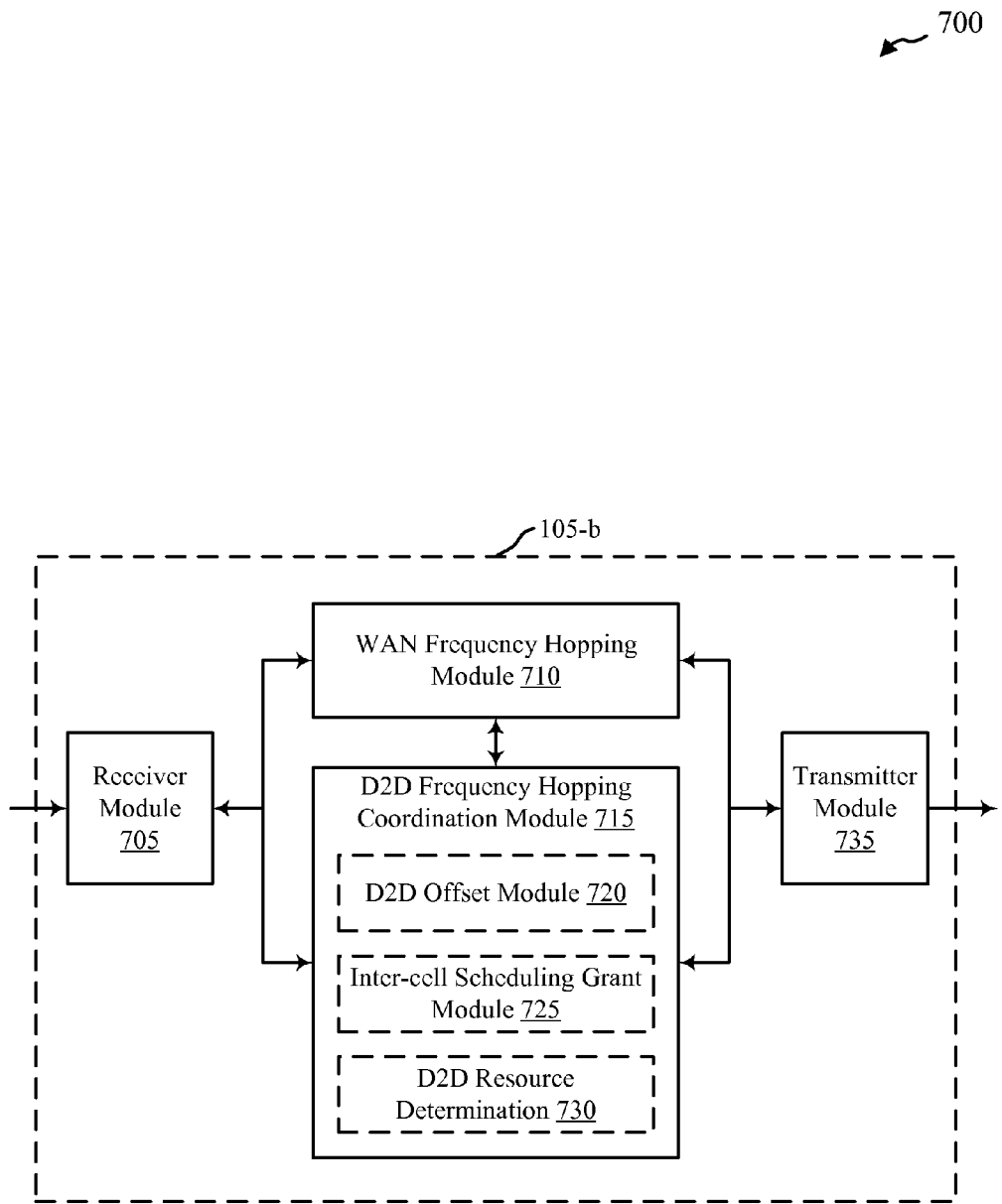
FIG. 7 is a block diagram of a device for coordinating a D2D frequency hopping scheme with a WAN frequency hopping scheme.

FIG. 7 shows a block diagram 700 of a base station 105-b configured for coordinating a D2D frequency hopping scheme with a WAN frequency hopping scheme, in accordance with various examples described herein. The base station 105-b may be an example of at least one aspect of base stations 105 described above with reference to FIG. 1 or 2. The base station 105-b may communicate with at least one UE 115 via communication link 125, as described above in reference to FIG. 1 or 2 or via the coordination techniques described in reference to FIG. 4, 5, or 6. The base station 105-b may include a receiver module 705, a WAN frequency hopping module 710, a D2D frequency hopping coordination module 715, and a transmitter module 735. In various examples, the D2D frequency hopping coordination module 715 may include one or more of a D2D offset module 720, an inter-cell scheduling grant module 725, or a D2D resource determination module 730. Each of these components may be in communication with each other.

The components of the base stations 105 may, individually or collectively, be implemented using at least one application-specific integrated circuit (ASICs) adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by at least one general or application-specific processor.

The receiver module 705 may receive information such as packet, data, or signaling information regarding what the base station 105-b has received or transmitted. The received information may be utilized by the base station 105-b for a variety of purposes. In some cases, the receiver module 705 may be configured to receive data or transmissions, for example from at least one UE 115, to further enable the various techniques described above for coordinating a D2D retransmission frequency hopping scheme with a WAN frequency hopping scheme for D2D enabled UEs 115.

The transmitter module 735 may transmit information such as packet, data, or signaling information from the base stations 105-b. In some cases, the transmitter module 735 may be configured to transmit data to one or more UEs 115, such as to coordinate D2D communications or retransmissions.

The WAN frequency hopping module 710, and in some cases with the receiver module 705, may identify a WAN frequency hopping scheme utilized in the WAN served by the base station 105-b. In some cases, the WAN frequency hopping module 710 may configure the WAN frequency hopping scheme, and in other cases the hopping scheme may be accessed from another network device via a request transmitted by the transmitter module 735. The WAN frequency hopping module 710 may communicate the WAN hopping scheme to the D2D frequency hopping coordination module 715.

The D2D frequency hopping coordination module 715 may utilize the WAN frequency hopping scheme to coordinate a D2D frequency hopping scheme, to be utilized for D2D retransmissions, that may interfere with uplink communications in the WAN. The D2D frequency hopping scheme may be coordinated to minimize interference with the WAN frequency hopping scheme. The D2D frequency hopping coordination module 715 may then communicate the D2D frequency hopping scheme to the transmitter module 735 to be transmitted to a D2D enabled UE 115, to implement the frequency hopping scheme.

In some examples, the D2D frequency hopping coordination module 715 may include a D2D offset module 720. If the WAN frequency hopping module 710 determines that the WAN frequency hopping scheme is type 1, the D2D offset module 720 may then be instructed to determine a first or second offset for D2D retransmissions. The D2D offset module 720 may determine a first offset for transmissions transmitted an even number of subframes after a first transmission or a second offset for transmissions transmitted an odd number of subframes after a first transmission. In some instances, the first or second offsets may be set to zero. The D2D offset module 720 may then communicate the first or second offsets to the transmitter module 735 to be transmitted to a D2D enabled UE 115, for example over the PDCCH.

In some examples, the D2D frequency hopping coordination module 715 may include an inter-cell scheduling grant module 725 and a D2D resource determination module 730. If the WAN frequency hopping module 710 determines that the WAN frequency hopping scheme is type 2, the inter-cell scheduling grant module 725 may then be instructed to configure a scheduling grant to be communicated via transmitter module 735 to a D2D enabled UE 115. The scheduling grant may include an indication of resources reserved for D2D communications. Accordingly, the scheduling grant may include a D2D frequency hopping scheme associated with the D2D-specific resources. In some cases, the scheduling grant may include an indication of the D2D frequency hopping scheme associated with a cell ID of the base station 105-b. The scheduling grant may further include instructions instructing the D2D enabled UE 115 to transmit the cell ID to a second D2D enabled UE 115, where the second D2D enabled UE 115 is not associated with the cell ID (e.g., an inter-cell UE 115). In this way, D2D inter-cell communications may be coordinated with the WAN frequency hopping scheme.

In some examples, the D2D resource determination module 730 may determine a subset of available PUSCH resources to be reserved for D2D communications (e.g., retransmissions). This may include determining a low resource block threshold, a high resource block threshold, or both. The D2D resource determination module may then communicate the one or more thresholds to the transmitter module 735 to be transmitted to the D2D enabled UE 115 to similarly reduce interference between WAN uplink retransmissions and D2D retransmissions.

Figure 8:
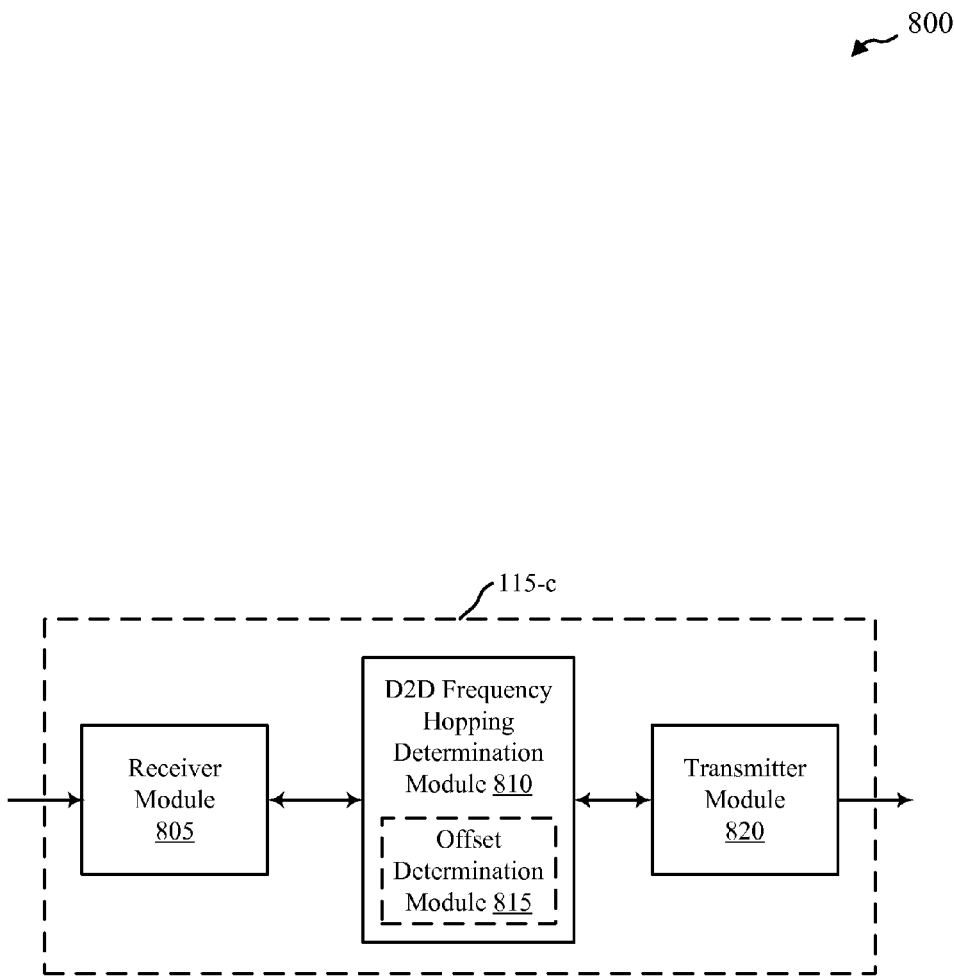
FIG. 8 is a block diagram of a device for communicating with an inter-cell D2D enabled UE according to a received D2D frequency hopping scheme.

FIG. 8 shows a block diagram 800 of a UE 115-c configured for retransmitting one or more messages to a D2D enabled UE 115 according to a D2D frequency hopping scheme communicated by a base station 105, in accordance with various examples described herein. The UE 115-c may be an example of at least one aspect of UEs 115 described above with reference to FIG. 1, or 2. The UE 115-c may communicate with at least one base station 105 via communication link 125 or at least one UE 115 via link 126 as described above in reference to FIG. 1 or 2 or via the coordination techniques described in reference to FIG. 4, 5, or 6. The UE 115-c may include a receiver module 805, a D2D frequency hopping determination module 810, which may further include an offset determination module 815, and a transmitter module 820. Each of these components may be in communication with each other.

The components of the UE 115-c may, individually or collectively, be implemented using at least one application-specific integrated circuit (ASICs) adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by at least one general or application-specific processor.

The receiver module 805 may receive information such as packet, data, or signaling information regarding what the UE 115-c has received or transmitted. The received information may be utilized by the UE 115-c for a variety of purposes. In some cases, the receiver module 805 may be configured to receive data or transmissions, for example from a base station 105, to further enable the various techniques described above for communicating with a D2D enabled UE 115 according to a base station determined D2D frequency hopping scheme.

The transmitter module 820 may transmit information such as packet, data, or signaling information from the UE 115-c. In some cases, the transmitter module 820 may be configured to transmit data on the uplink to a one or more base stations 105 via links 125 or transmit one or more D2D messages to a D2D enabled UE 115 via links 126 described in reference to FIG. 1 or 2.

The receiver module 805 may receive a D2D frequency hopping scheme from a base station 105 associated with a WAN with a coverage are corresponding to a location of the UE 115-c. The D2D frequency hopping scheme may be coordinated with a WAN frequency hopping scheme, for example by the base station 105. The receiver module 805 may communicate this information to the D2D frequency hopping determination module 810, which may identify the communicated D2D frequency hopping scheme.

In some instances, the offset determination module 815 of the D2D frequency hopping determination module 810 may identify/determine one or more offsets (e.g., in the WAN type 1 hopping scheme example), for retransmitting one or more messages to another D2D enabled UE 115. In some cases, a first offset may correspond to transmissions transmitted on even subframes after a first transmission, whereas a second offset may correspond to transmissions transmitted on odd subframes after the first transmission. Once the offsets have been identified/determined from the information communicated in the message from the base station 105, the offset determination module 815 may instruct the transmitter module 830 to transmit a scheduling assignment/retransmit a D2D message according to the first or second offsets to the another D2D enabled UE 115.

In other instances, the D2D frequency hopping determination module 810 may determine resources reserved for D2D communications. In such a case, the D2D frequency hopping determination module 810 may determine a D2D frequency hopping scheme based on the D2D-specific resources. In this or other instances, the D2D frequency hopping determination module 810 may determine resources for transmissions/retransmissions to another D2D enabled UE 115 based on information received from the base station 105. In some cases, this may include identifying one or more thresholds for D2D allocated resources. The D2D frequency hopping determination module 810 may then instruct the transmitter module 820 to transmit/retransmit to the D2D UE 115 on the allocated resources.

In some cases, the D2D frequency hopping determination module 810 may determine a cell ID associated with the base station 105 or the WAN frequency hopping scheme implemented by the base station 105. The UE 115-c may then instruct the transmitter module 820 to communicate the cell ID to the inter-cell D2D enabled UE 115 to instruct the inter-cell D2D enabled UE 115 to avoid retransmitting on resources utilized by the WAN hopping scheme, etc., as described above.

Figure 9:
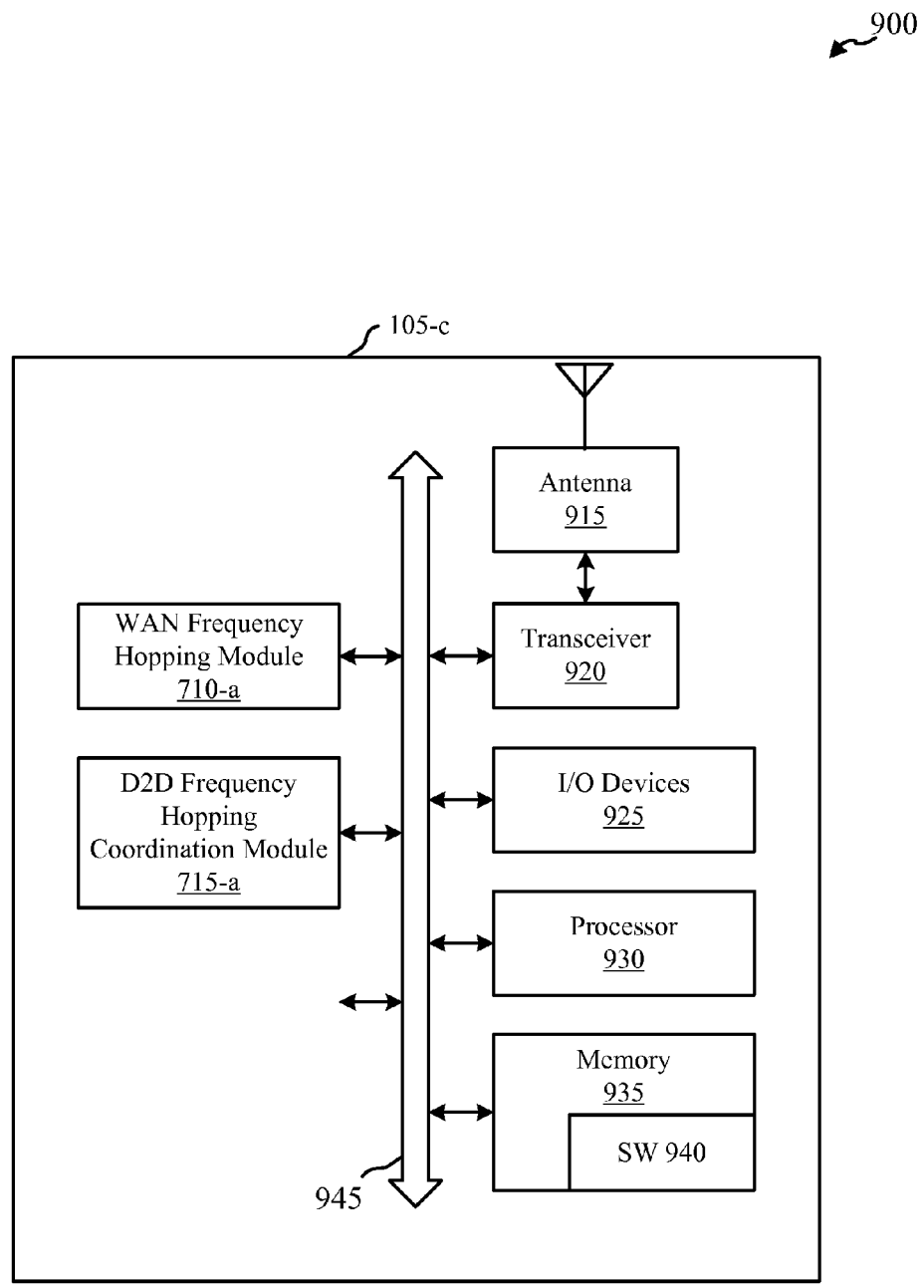
FIG. 9 is a block diagram of a base station for coordinating a D2D frequency hopping scheme with a WAN frequency hopping scheme.

FIG. 9 shows a block diagram 900 of a base station 105-c configured for coordinating a D2D frequency hopping scheme with a WAN frequency hopping scheme for a D2D enabled UE 115, in accordance with various examples described herein. The base station 105-b may be an example of at least one aspect of base stations 105 described above with reference to FIG. 1, 2 or 7 or may implement at least one aspect of the WAN frequency hopping module 710 or the D2D frequency hopping coordination module 715 described above with reference to FIG. 7. The base stations 105-c may communicate with at least one UE 115 via communication link 125, as described above in reference to FIG. 1 or 2 or via the coordination techniques described in reference to FIG. 4, 5, or 6.

The components of the base station 105-c may, individually or collectively, be implemented using at least one application-specific integrated circuit (ASIC) adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by at least one general or application-specific processor.

The base station 105-c includes antenna(s) 915, transceiver(s) 920, memory 935, a processor 930, and I/O devices 925, which each may be in communication, directly or indirectly, with each other, for example, via at least one bus 945. The transceiver(s) 920 may be configured to communicate bi-directionally, via the antennas 915 with at least one wired or wireless link, such as any of communication links 125 or 126 described above in reference to FIG. 1, or 2. The transceiver(s) 920 may include a modem configured to modulate the packets and provide the modulated packets to the antennas 915 for transmission, and to demodulate packets received from the antennas 915. The transceiver(s) 920 may, in conjunction with the antennas 915, transmit and receive packets. The transceiver(s) 920 may be configured to maintain multiple concurrent communication links using the same or different radio interfaces (e.g., Wi-Fi, cellular, etc.). The base station 105-c may include a single antenna 915, or the base station 105-c may include multiple antennas 915. The base station 105-c may be capable of employing multiple antennas 915 for transmitting and receiving communications in a multiple-input multiple-output (MIMO) communication system.

The memory 935 may include random access memory (RAM) and read-only memory (ROM). The memory 935 may store computer-readable, computer-executable software 940 containing instructions that are configured to, when executed, cause the processor 930 to perform various functions described herein. Alternatively, the software 940 may not be directly executable by the processor 930 but may be configured to cause the computer (e.g., when compiled and executed) to perform functions described herein. The processor 930 may include an intelligent hardware device (e.g., a central processing unit (CPU), a microcontroller, an application specific integrated circuit (ASIC), etc.).

According to the architecture of FIG. 9, the base station 105-c may further include a WAN frequency hopping module 710-a and a D2D frequency hopping coordination module 715-a. By way of example, these components of base station 105-c may be in communication with some or all of the other components of the base station 105-c via bus 945. Additionally or alternatively, functionality of these modules may be implemented via the transceiver 920, as a computer program product stored in software 940, or as at least one controller element of the processor 930. In some examples, the WAN frequency hopping module 710-a and the D2D frequency hopping coordination module 715-a, including one or more of the D2D offset module 720, the inter-cell scheduling grant module 725, or the D2D resource determination module 730, may be implemented as subroutines in memory 935/software 940 executed by the processor 930. In other cases, these modules may be implemented as sub-modules in the processor 930 itself.

The WAN frequency hopping module 710-a and the D2D frequency hopping coordination module 715-a of base station 105-c may further implement the procedures described above for coordinating a D2D frequency hopping pattern with a WAN frequency hopping pattern for D2D retransmissions of a UE 115, and for the sake of brevity, will not be repeated here.

Figure 10:
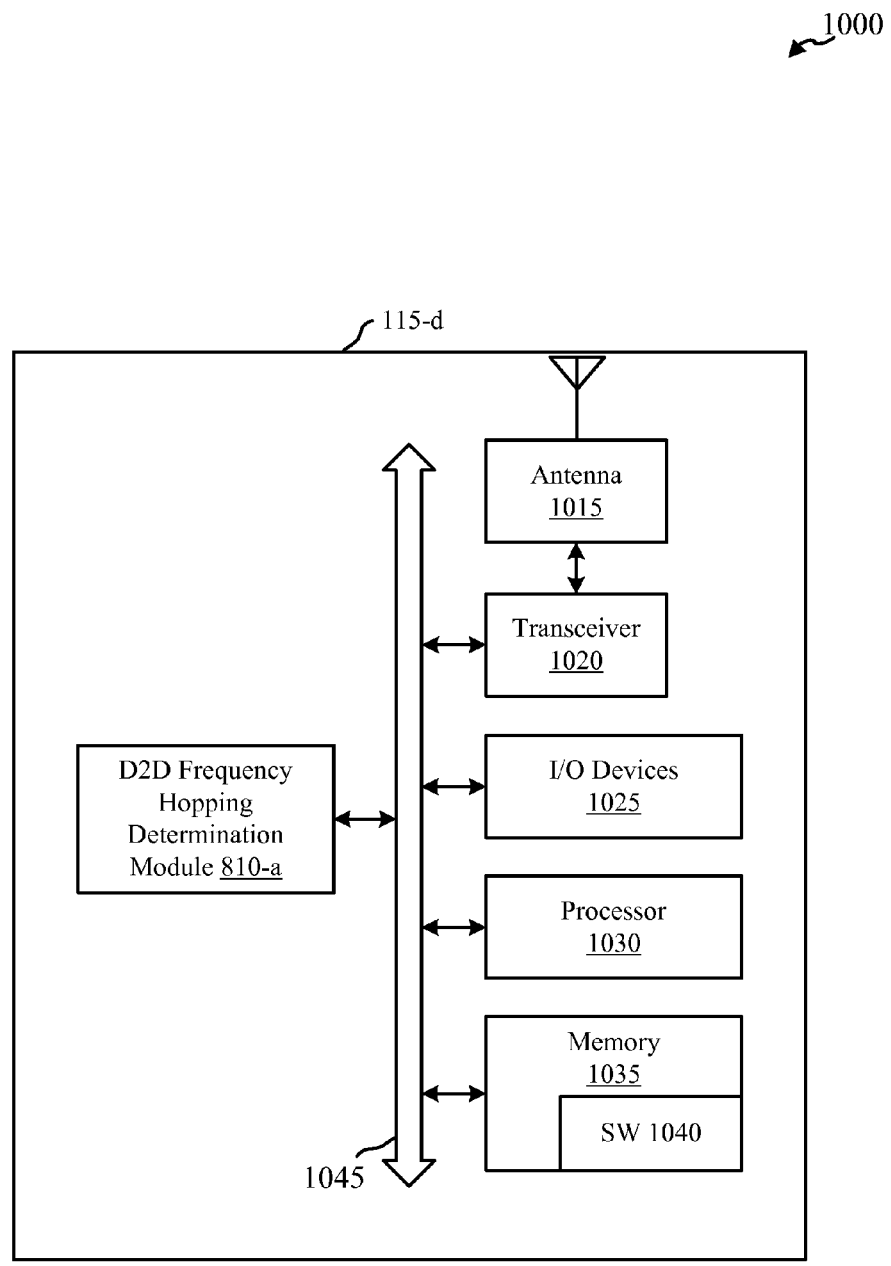
FIG. 10 is a block diagram of a D2D enabled UE for communicating with an inter-cell D2D enabled UE via a received D2D frequency hopping scheme.

FIG. 10 is a block diagram 1000 of a UE 115-d configured for retransmitting one or messages to a D2D enabled UE 115 according to a D2D frequency hopping scheme communicated by a base station 105, in accordance with various examples described herein. The UE 115-d may be an example of at least one aspect of UEs 115 described above with reference to FIG. 1, 2, or 8 or may implement at least one aspect of the D2D frequency hopping determination module 810 or the offset determination module 815 described above with reference to FIG. 8. The UE 115-d may communicate with at least one base station 105 via communication link 125 or at least one UE 115 via link 126 as described above in reference to FIG. 1 or 2 or via the coordination techniques described in reference to FIG. 4, 5, or 6. The UE 115-d may have any of various configurations, such as personal computers (e.g., laptop computers, netbook computers, tablet computers, etc.), smartphones, cellular telephones, PDAs, wearable computing devices, digital video recorders (DVRs), internet appliances, routers, gaming consoles, e-readers, display devices, printers, etc. The UE 115-d may have an internal power supply (not shown), such as a small battery, to facilitate mobile operation.

The components of the UE 115-d may, individually or collectively, be implemented using at least one application-specific integrated circuit (ASIC) adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by at least one general or application-specific processor.

The UE 115-d includes antenna(s) 1015, transceiver(s) 1020, memory 1035, a processor 1030, and I/O devices 1025, which each may be in communication, directly or indirectly, with each other, for example, via at least one bus 1045. The transceiver(s) 1020 may be configured to communicate bi-directionally, via the antennas 1015 with at least one wired or wireless link, such as any of communication links 125 or 126 described above in reference to FIG. 1, or 2. The transceiver(s) 1020 may include a modem configured to modulate the packets and provide the modulated packets to the antennas 1015 for transmission, and to demodulate packets received from the antennas 1015. The transceiver(s) 1020 may, in conjunction with the antennas 1015, transmit and receive packets. The transceiver(s) 1020 may be configured to maintain multiple concurrent communication links using the same or different radio interfaces (e.g., Wi-Fi, cellular, etc.). The UE 115-d may include a single antenna 1015, or the UE 115-d may include multiple antennas 1015. The UE 115-d may be capable of employing multiple antennas 1015 for transmitting and receiving communications in a multiple-input multiple-output (MIMO) communication system.

The memory 1035 may include random access memory (RAM) and read-only memory (ROM). The memory 1035 may store computer-readable, computer-executable software 1040 containing instructions that are configured to, when executed, cause the processor 1030 to perform various functions described herein. Alternatively, the software 1040 may not be directly executable by the processor 1030 but may be configured to cause the computer (e.g., when compiled and executed) to perform functions described herein. The processor 1030 may include an intelligent hardware device (e.g., a central processing unit (CPU), a microcontroller, an application specific integrated circuit (ASIC), etc.).

According to the architecture of FIG. 10, the UE 115-*d* may further include a D2D frequency hopping determination module 810-*a*. By way of example, this and other components of UE 115-*d* may be in communication with some or all of the other components of the UE 115-*d* via bus 1045. Additionally or alternatively, functionality of these modules may be implemented via the transceiver 1020, as a computer program product stored in software 1040, or as at least one controller element of the processor 1030. In some examples, the D2D frequency hopping module 810-*a*, including the offset determination module 815, may be implemented as subroutines in memory 1035/software 1040 executed by the processor 1030. In other cases, these module may be implemented as sub-modules in the processor 1030 itself.

The D2D frequency hopping determination module 810-*a* may further implement the procedures described above for communicating (e.g., via retransmissions) with a D2D enabled UE 115 according to a D2D frequency hopping scheme communicated from a serving base station 105, and for the sake of brevity, will not be repeated here.

Figure 11:
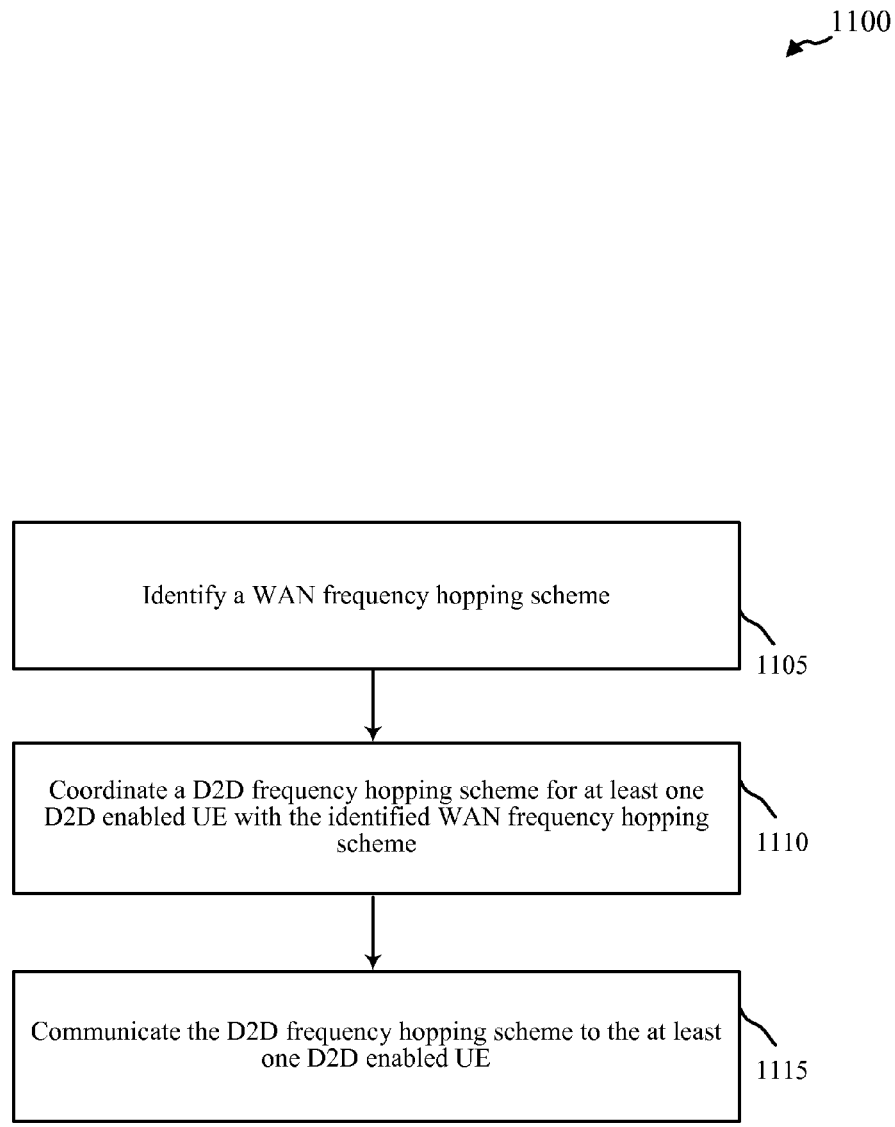
FIGS. 11-12 illustrate flowcharts of methods for coordinating D2D frequency hopping with WAN frequency hopping.

FIG. 11 is a flow chart illustrating one example of a method 1100 for coordinating a D2D frequency hopping scheme for D2D retransmissions with a WAN frequency hopping scheme used for HARQ retransmissions, in accordance with various examples described herein. For clarity, the method 1100 is described below with reference to at least one aspect of one of the base stations 105 described with reference to FIG. 1, 2, 7, or 9. In some examples, a device, such as one of the base stations 105, may execute at least one set of codes to control the functional elements of the device to perform the functions described below.

At block 1105, a base station 105 may identify a WAN frequency hopping scheme used in the WAN served by the base station 105. The operation(s) at block 1105 may in some cases be performed using the WAN frequency hopping module 710 described with reference to FIG. 7 or 9.

At block 1110, the base station 105 may coordinate a D2D frequency hopping scheme for at least one D2D enabled UE with the identified WAN frequency hopping scheme. The operation(s) at block 1110 may in some cases be performed using the D2D frequency hopping module 715 described with reference to FIG. 7 or 9.

At block 1115, the base station 105 may communicate the D2D frequency hopping scheme to the at least one D2D enabled UE. The operation(s) at block 1115 may in some cases be performed using the transmitter module 735 described with reference to FIG. 7 or 9.

Thus, the method 1100 may provide for coordinating a D2D frequency hopping scheme with a WAN frequency hopping scheme. It should be noted that the method 1100 is just one implementation and that the operations of the method 1100 may be rearranged or otherwise modified such that other implementations are possible.

Figure 12:
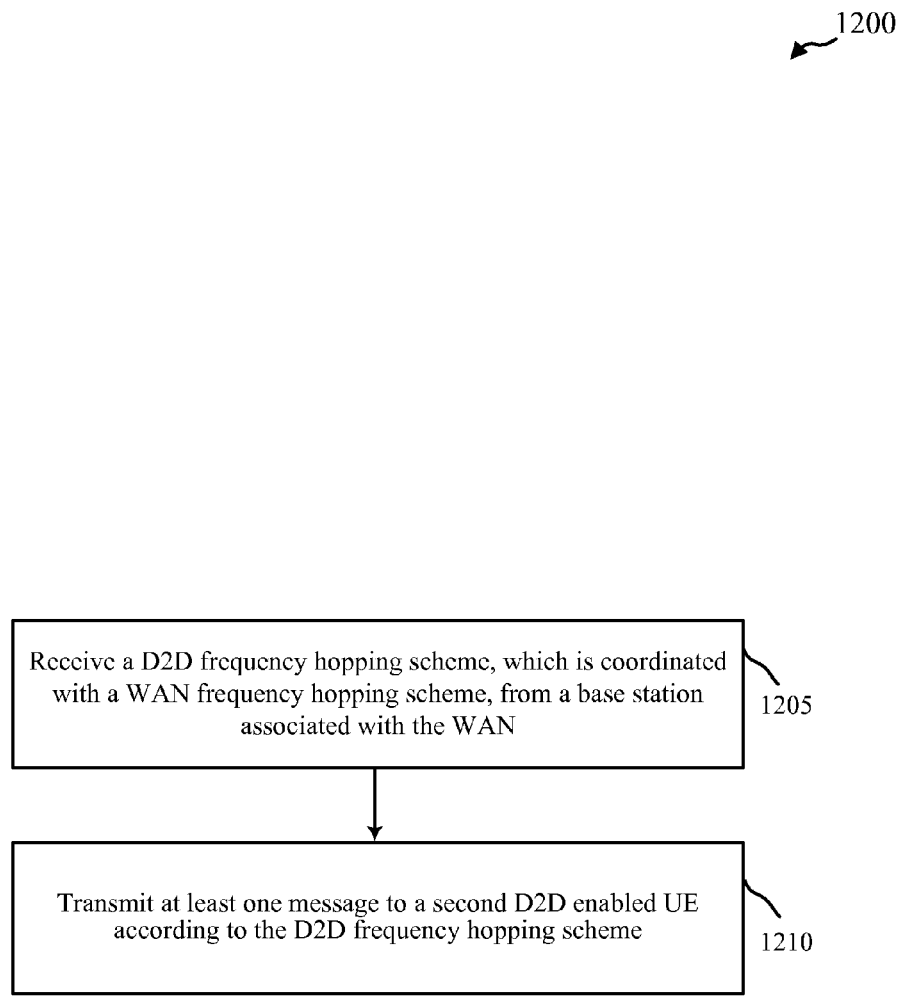

FIG. 12 is a flow chart illustrating one example of a method 1200 for communicating with a D2D enabled UE 115 according to a D2D frequency hopping scheme coordinated with a WAN frequency hopping scheme, in accordance with various examples described herein. For clarity, the method 1100 is described below with reference to at least one aspect of one of UEs 115 described with reference to FIG. 1, 2, 8, or 10. In some examples, a device, such as one of the UEs 115, may execute at least one set of codes to control the functional elements of the device to perform the functions described below.

At block 1205, a UE 115 may receive a D2D frequency hopping scheme, which is coordinated with a WAN frequency hopping scheme, from a base station 105 associated with the WAN. The operation(s) at block 1205 may in some cases be performed using the WAN frequency hopping determination module 810 or the receiver module 805 described with reference to FIG. 8 or 10.

At block 1210, UE 115 may transmit at least one message to a second D2D enabled UE 115 according to the D2D frequency hopping scheme. The operation(s) at block 1210 may in some cases be performed using the WAN frequency hopping determination module 810 or the transmitter module 820 described with reference to FIG. 8 or 10.

Thus, the method 1200 may provide for communicating with a D2D enabled UE 115 according to a D2D frequency hopping scheme. It should be noted that the method 1200 is just one implementation and that the operations of the method 1200 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication comprising:
    identifying, by a base station, a wide area network (WAN) frequency hopping scheme, wherein the WAN frequency hopping scheme comprises a fixed offset signaled via a Physical Downlink Control Channel (PDCCH) for every other transmission of a Hybrid Automatic Repeat Request (HARQ) process;
    coordinating a device to device (D2D) frequency hopping scheme for at least one D2D enabled user equipment (UE) with the identified WAN frequency hopping scheme, wherein the D2D frequency hopping scheme comprises a first offset for a first subset of transmissions and a second offset different from the first offset for a second subset of transmissions different from the first subset of transmissions; and
    communicating the D2D frequency hopping scheme to the at least one D2D enabled UE.

2. The method of claim 1, wherein coordinating the D2D frequency hopping scheme with the WAN frequency hopping scheme comprises:
    configuring the D2D frequency hopping scheme to reduce interference with the WAN frequency hopping scheme.

3. The method of claim 1, wherein coordinating the D2D frequency hopping scheme with the WAN frequency hopping scheme comprises:
    utilizing the first offset for even transmissions, wherein each even transmission is transmitted an even number of subframes after a first transmission; and
    utilizing the second offset for odd transmissions, wherein each odd transmission is transmitted an odd number of subframes after the first transmission.

4. The method of claim 3, wherein the second offset is set to zero.

5. The method of claim 3, wherein communicating the D2D frequency hopping scheme to the at least one D2D enabled UE comprises:
    transmitting at least one of the first offset, or the second offset, or both, via the PDCCH.

6. The method of claim 3, wherein at least one of the fixed offset, or the first offset, or the second offset, or a combination thereof comprise a number of resource blocks.

7. The method of claim 1, wherein the WAN frequency hopping scheme applies to uplink transmissions.

8. The method of claim 7, wherein the WAN frequency hopping scheme utilizes synchronous Hybrid Automatic Repeat Request (HARQ).

9. A method of wireless communication comprising:
receiving, by a device to device (D2D) enabled user equipment (UE), a D2D frequency hopping scheme from a base station associated with a wide area network (WAN), wherein the D2D frequency hopping scheme is coordinated with a WAN frequency hopping scheme, wherein the WAN frequency hopping scheme comprises a fixed offset signaled via a Physical Downlink Control Channel (PDCCH) for every other transmission of a Hybrid Automatic Repeat Request (HARQ) process, wherein the D2D frequency hopping scheme comprises a first offset for a first subset of transmissions and a second offset different from the first offset for a second subset of transmissions different from the first subset of transmissions; and
transmitting at least one D2D message to a second D2D enabled UE according to the D2D frequency hopping scheme.

10. The method of claim 9, wherein the at least one message comprises a scheduling assignment.

11. The method of claim 9, wherein the D2D frequency hopping scheme comprises the first offset to be applied for even transmissions, wherein each even transmission is transmitted an even number of subframes after a first transmission.

12. The method of claim 11, wherein the D2D frequency hopping scheme further comprises the second offset to be applied for odd transmissions, wherein each odd transmission is transmitted an odd number of subframes after the first transmission.

13. A base station comprising:
a wide area network (WAN) frequency hopping module to identify a WAN frequency hopping scheme, wherein the WAN frequency hopping scheme comprises a fixed offset signaled via a Physical Downlink Control Channel (PDCCH) for every other transmission of a Hybrid Automatic Repeat Request (HARQ) process;
a device to device (D2D) frequency hopping module to coordinate a D2D frequency hopping scheme for at least one D2D enabled user equipment (UE) with the identified WAN frequency hopping scheme, wherein the D2D frequency hopping scheme comprises a first offset for a first subset of transmissions and a second offset different from the first offset for a second subset of transmissions different from the first subset of transmissions; and
a transmitter to communicate the D2D frequency hopping scheme to the at least one D2D enabled UE.

14. The base station of claim 13, wherein the D2D frequency hopping module is further configured to: configure the D2D frequency hopping scheme to reduce interference with the WAN frequency hopping scheme.

15. The base station of claim 13, wherein the D2D frequency hopping module is further configured to:
utilize the first offset for even transmissions, wherein each even transmission is transmitted an even number of subframes after a first transmission; and
utilize the second offset for odd transmissions, wherein each odd transmission is transmitted an odd number of subframes after the first transmission.

16. The base station of claim 15, wherein the second offset is set to zero.

17. The base station of claim 15, wherein the transmitter is further configured to:
transmit at least one of the first offset, or the second offset, or both, via the PDCCH.

18. The base station of claim 15, wherein at least one of the fixed offset, or the first offset, or the second offset, or a combination thereof comprise a number of resource blocks.

19. A user equipment (UE) comprising:
a device to device (D2D) frequency hopping determination module to receive a D2D frequency hopping scheme from a base station associated with a wide area network (WAN), wherein the D2D frequency hopping scheme is coordinated with a WAN frequency hopping scheme, wherein the WAN frequency hopping scheme comprises a fixed offset signaled via a Physical Downlink Control Channel (PDCCH) for every other transmission of a Hybrid Automatic Repeat Request (HARQ) process, wherein the D2D frequency hopping scheme comprises a first offset for a first subset of transmissions and a second offset different from the first offset for a second subset of transmissions different from the first subset of transmissions; and
a transmitter to transmit at least one message to a second D2D enabled UE according to the D2D frequency hopping scheme.

20. The UE of claim 19, wherein the at least one message comprises a scheduling assignment.

21. The UE of claim 19, wherein the D2D frequency hopping scheme comprises the first offset to be applied for even transmissions, wherein each even transmission is transmitted an even number of subframes after a first transmission.

22. The UE of claim 21, wherein the D2D frequency hopping scheme further comprises the second offset to be applied for odd transmissions, wherein each odd transmission is transmitted an odd number of subframes after the first transmission.

* * * * *